US012591533B2

(12) United States Patent
De Vita et al.

(10) Patent No.: US 12,591,533 B2
(45) Date of Patent: Mar. 31, 2026

(54) CONFIGURABLE STREAM SWITCH WITH VIRTUAL CHANNELS FOR THE SHARING OF I/O PORTS IN STREAM-BASED ARCHITECTURES

(71) Applicant: STMicroelectronics International N.V., Geneva (CH)

(72) Inventors: Antonio De Vita, Milan (IT); Thomas Boesch, Rovio (CH); Giuseppe Desoli, San Fermo Della Battaglia (IT)

(73) Assignee: STMicroelectronics International N.V., Geneva (CH)

( * ) Notice: Subject to any disclaimer, the term of this patent is extended or adjusted under 35 U.S.C. 154(b) by 108 days.

(21) Appl. No.: 18/304,938

(22) Filed: Apr. 21, 2023

(65) Prior Publication Data

US 2024/0354269 A1      Oct. 24, 2024

(51) Int. Cl.
  *G06F 13/368* (2006.01)
  *G06F 9/50* (2006.01)
  *G06F 13/374* (2006.01)

(52) U.S. Cl.
  CPC .......... *G06F 13/374* (2013.01); *G06F 9/5077* (2013.01); *G06F 2209/5011* (2013.01)

(58) Field of Classification Search
  None
  See application file for complete search history.

(56) References Cited

U.S. PATENT DOCUMENTS 7,088,710 B1 *  8/2006  Johnson ............. H04Q 11/0478
                                                          370/357
8,331,387 B2   12/2012  Kwan et al.

9,674,114 B2    6/2017  Park et al.
10,402,527 B2   9/2019  Boesch et al.
10,417,364 B2   9/2019  Boesch et al.
                (Continued)

FOREIGN PATENT DOCUMENTS

EP          3346427 A1     7/2018

OTHER PUBLICATIONS

Fu et al., "Receptive-Field and Switch-Matrices Based ReRAM Accelerator with Low Digital-Analog Conversion for CNNs," 2021 *Design, Automation & Test in Europe Conference & Exhibition (DATE)*, Grenoble, France, Feb. 1-5, 2021, pp. 244-247.

(Continued)

*Primary Examiner* — Dean Phan
(74) *Attorney, Agent, or Firm* — Seed IP Law Group LLP

(57)          ABSTRACT

A stream switch includes a data router, configuration registers, and arbitration logic. The data router has a plurality of input ports, each having a plurality of associated virtual input channels, and a plurality of output ports, each having a plurality of associated virtual output channels. The data router transmits data streams from input ports to one or more output ports of the plurality of output ports. The configuration registers store configuration data associated with the virtual output channels of the respective output ports of the plurality of output ports. The stored configuration data identifies a source input port and virtual input channel ID associated with the virtual output channel of the output port. The arbitration logic allocates bandwidth of the data router based on request signals associated with virtual input channels of the input ports and the configuration data associated with the virtual output channels.

32 Claims, 25 Drawing Sheets

Digit Recognition

(56) References Cited

U.S. PATENT DOCUMENTS

| | | | | |
|---|---|---|---|---|
| 11,308,406 | B2 | 4/2022 | Arrigoni et al. | |
| 11,562,115 | B2 | 1/2023 | Boesch et al. | |
| 2003/0021282 | A1* | 1/2003 | Hospodor | H04L 47/822 |
| | | | | 370/401 |
| 2009/0222610 | A1* | 9/2009 | Yamazaki | G06F 13/28 |
| | | | | 710/308 |
| 2009/0304017 | A1* | 12/2009 | Lee | H04L 45/00 |
| | | | | 370/412 |
| 2011/0149985 | A1* | 6/2011 | Ashida | H04L 45/02 |
| | | | | 370/401 |
| 2012/0207175 | A1* | 8/2012 | Raman | H04L 47/125 |
| | | | | 370/412 |
| 2013/0250792 | A1* | 9/2013 | Yoshida | H04L 49/9047 |
| | | | | 370/252 |
| 2018/0189229 | A1 | 7/2018 | Desoli et al. | |
| 2018/0189641 | A1 | 7/2018 | Boesch et al. | |
| 2020/0272779 | A1 | 8/2020 | Boesch et al. | |
| 2020/0410323 | A1 | 12/2020 | Vinod et al. | |
| 2022/0374288 | A1 | 11/2022 | Kibardin et al. | |

OTHER PUBLICATIONS

Li et al., "ALPHA: A Learning-Enabled High-Performance Network-on-Chip Router Design for Heterogeneous Manycore Architectures," *IEEE Transactions on Sustainable Computing* 6(2):274-288, Apr.-Jun. 2021.

Park et al., "A Reconfigurable Platform for the Design and Verification of Domain-Specific Accelerators," *17th Asia and South Pacific Design Automation Conference*, IEEE, Sydney, NSW, Australia, Jan. 30-Feb. 2, 2012, pp. 108-113.

Tiwari et al., "Data Streaming and Traffic Gathering in Mesh-based NoC for Deep Neural Network Acceleration," arXiv:2108.02569v1 [cs.LG], Aug. 1, 2021. (12 pages).

Yazici, "A Novel Flexible On-Chip Switch Architecture for Reconfigurable Hardware Accelerators," Thesis Submitted To the Graduate School of Natural and Applied Sciences of Middle East Technical University, Aug. 2021. (105 pages).

* cited by examiner

FIG. 9

| CONF REG NAME | SRC | VCID |
|---|---|---|
| DST0_VC0 | 0 | 0 |
| DST0_VC1 | 1 | 0 |
| DST0_VC2 | 0 | 1 |
| DST1_VC0 | 0 | 1 |
| DST1_VC1 | 0 | 0 |
| DST1_VC2 | 1 | 0 |

1202

| CONF REG NAME | SRC | VCID |
|---|---|---|
| DST0_VC0 | 0 | 0 |
| DST0_VC1 | 1 | 0 |
| DST1_VC0 | 1 | 0 |
| DST1_VC1 | 0 | 0 |

ARBITERS CHOICES:
* ARBITER0 = VC0
* ARBITER1 = VC0

CONFIGURABLE STREAM SWITCH WITH VIRTUAL CHANNELS FOR THE SHARING OF I/O PORTS IN STREAM-BASED ARCHITECTURES

BACKGROUND

Technical Field

The present disclosure generally relates to hardware accelerators in stream-based architectures, such as convolutional accelerators used in a learning/inference machine (e.g., an artificial neural network (ANN), such as a convolutional neural network (CNN)).

Description of the Related Art

Various computer vision, speech recognition, and signal processing applications may benefit from the use of learning/inference machines, which may quickly perform hundreds, thousands, or even millions of concurrent operations. Learning/inference machines, as discussed in this disclosure, may fall under the technological titles of machine learning, artificial intelligence, neural networks, probabilistic inference engines, accelerators, and the like.

Such learning/inference machines may include or otherwise utilize CNNs, such as deep convolutional neural networks (DCNN). A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer. Hardware accelerators employing stream-based architectures, including convolutional accelerators, are often employed to accelerate the processing of large amounts of data by a DCNN.

BRIEF SUMMARY

In an embodiment, a stream switch comprises a data router, configuration registers and arbitration logic. The data router has a plurality of input ports, each input port having plurality of associated virtual input channels, and a plurality of output ports, each output port having a plurality of associated virtual output channels. The data router, in operation, transmits data streams from input ports of the plurality of input ports to one or more output ports of the plurality of output ports. The configuration registers are coupled to the data router and, in operation, store configuration data associated with the virtual output channels of the respective output ports of the plurality of output ports. The stored configuration data associated with a virtual output channel identifies a source input port and virtual input channel ID associated with the virtual output channel of the output port. The arbitration logic is coupled to the configuration registers and the data router. The arbitration logic, in operation, allocates bandwidth of the data router based on request signals associated with virtual input channels of the input ports and the configuration data associated with the virtual output channels.

In an embodiment, a hardware accelerator comprises a plurality of processing elements, a plurality of streaming engines, and a stream switch. The stream switch is coupled to the plurality of processing elements and to the plurality of streaming engines. In operation, the stream switch streams data between the plurality of streaming engines and the plurality of processing elements. The stream switch includes a data router, configuration registers, and arbitration logic. The data router has a plurality of input ports, each input port having a plurality of associated virtual input channels, and a plurality of output ports, each output port having a plurality of associated virtual output channels. The data router, in operation, transmits data streams from input ports of the plurality of input ports to one or more output ports of the plurality of output ports. The configuration registers are coupled to the data router, and, in operation, store configuration data associated with the virtual output channels of the respective output ports of the plurality of output ports. The stored configuration data associated with a virtual output channel identifies a source input port and virtual input channel ID associated with the virtual output channel of the output port. The arbitration logic is coupled to the configuration registers and the data router. In operation, the arbitration logic allocates bandwidth of the data router based on request signals associated with virtual input channels of the input ports and the configuration data associated with the virtual output channels.

In an embodiment, a method comprises storing configuration data associated with virtual output channels of output ports of a data router of a stream switch. The data router has a plurality of input ports, each having an associated plurality of virtual input channels, and a plurality of output ports, each having a plurality of associated virtual output channels. The stream switch receives requests to transmit data streams associated with respective virtual input channels of the plurality of input ports. For each output port of the plurality of output ports, a virtual output channel of the plurality of virtual output channels associated with the output port is selected, based on the request signals associated with virtual input channels of the input ports and the configuration data associated with the virtual output channels. Bandwidth of the data router is allocated to virtual input channels of the input ports based on the selected virtual output channels. Data is streamed via the data router based on the allocated bandwidth.

BRIEF DESCRIPTION OF THE SEVERAL VIEWS OF THE DRAWINGS

One or more embodiments are described hereinafter with reference to the accompanying drawings.

FIG. 9 is a functional block diagram of an embodiment of an electronic device or system of the presently disclosed technology.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, physical component layout, convolutional accelerators, Multiply-ACcumulate (MAC) circuitry, control registers, bus systems, etc., in a programmable hardware accelerator environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figures 1, 2:
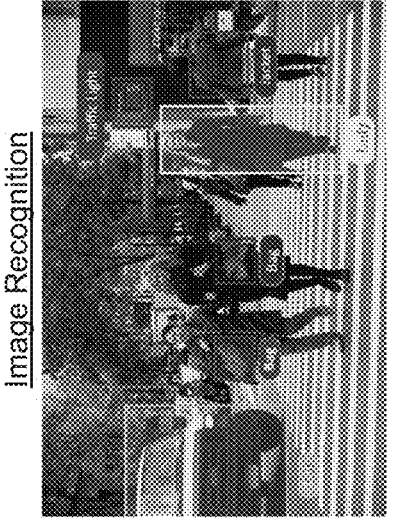
FIG. 1 is a conceptual diagram illustrating a digit recognition task.
FIG. 2 is a conceptual diagram illustrating an image recognition task.

CNNs are particularly suitable for recognition tasks, such as recognition of numbers or objects in images, and may provide highly accurate results. FIG. 1 is a conceptual diagram illustrating a digit recognition task and FIG. 2 is a conceptual diagram illustrating an image recognition task.

Figure 3:
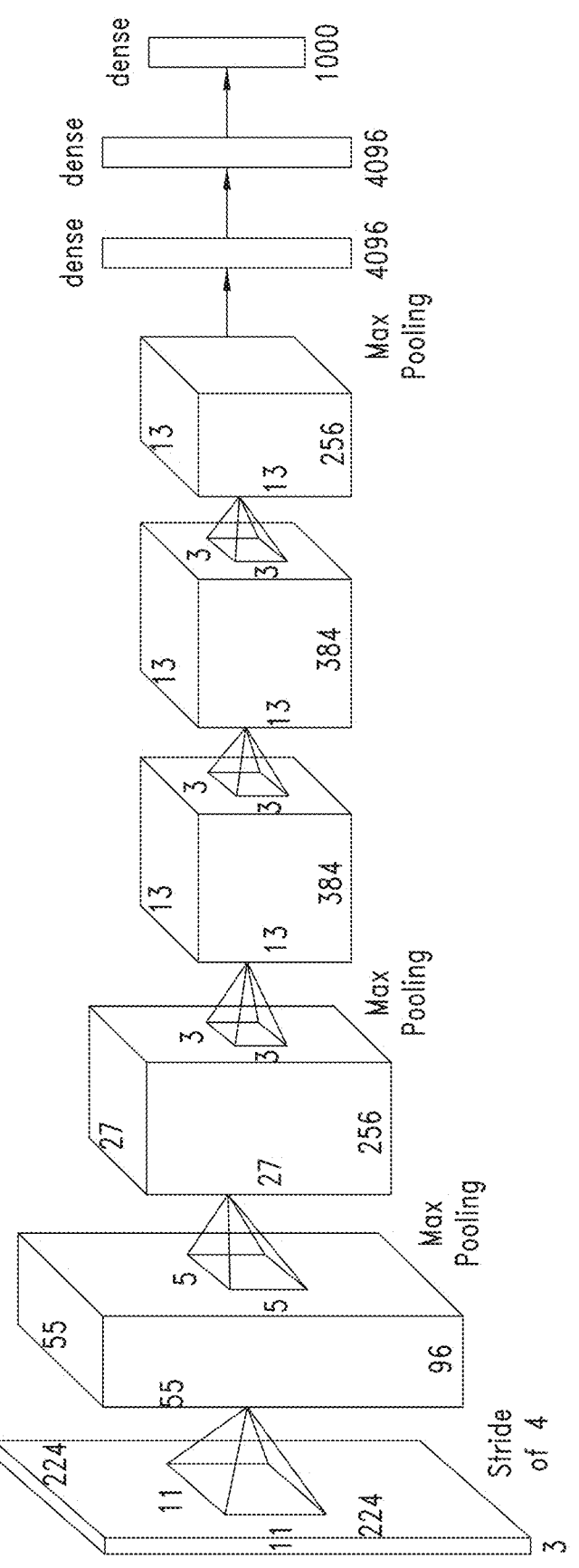
FIG. 3 is a conceptual diagram illustrating an example of a CNN.

CNNs are specific types of deep neural networks (DNN) with one or multiple layers which perform a convolution on a multi-dimensional feature data tensor (e.g., a three-dimensional data tensor having width×height×depth). The first layer is an input layer and the last layer is an output layer. The intermediate layers may be referred to as hidden layers. The most used layers are convolutional layers, fully connected or dense layers, and pooling layers (max pooling, average pooling, etc). Data exchanged between layers are called features or activations. Each layer also has a set of learnable parameters typically referred to as weights or kernels. FIG. 3 is a conceptual diagram illustrating an example of an CNN, that is AlexNet. The illustrated CNN has a set of convolutional layers interleaved with max pooling layers, followed by a set of fully connected or dense layers.

Figure 4:
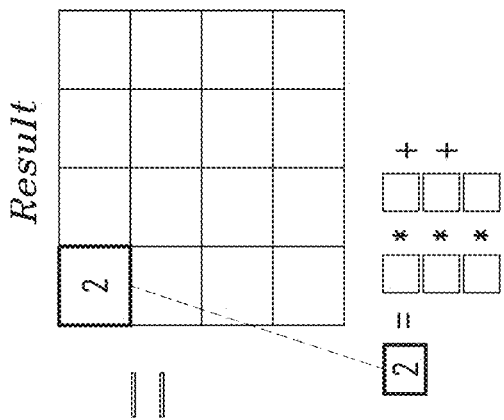
FIG. 4 is a conceptual diagram illustrating an example application of a kernel to a feature map.
Figure 4:
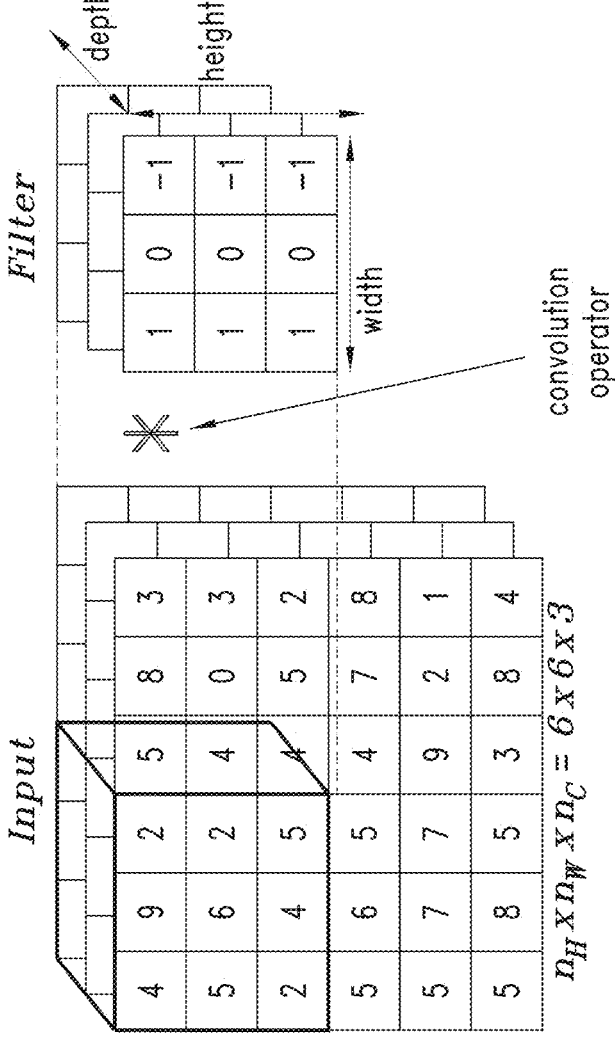

The parameters of a convolutional layer include a set of learnable filters referred to as kernels. Each kernel has three dimensions, height, width and depth. The height and width are typically limited in range (e.g., [1, 11]). The depth typically extends to the full depth of an input feature data. Each kernel slides across the width and the height of the input features and a dot product is computed. At the end of the process a result is obtained as a set of two-dimensional feature maps. In a convolutional layer, many kernels are applied to an input feature map, each of which produces a different feature map as a result. The depth of the output feature tensors is also referred to the number of output channels. FIG. 4 is a conceptual diagram illustrating an example application of a kernel to a feature map, producing a two-dimensional feature map having a height of 4 and a width of 4.

Figure 5:
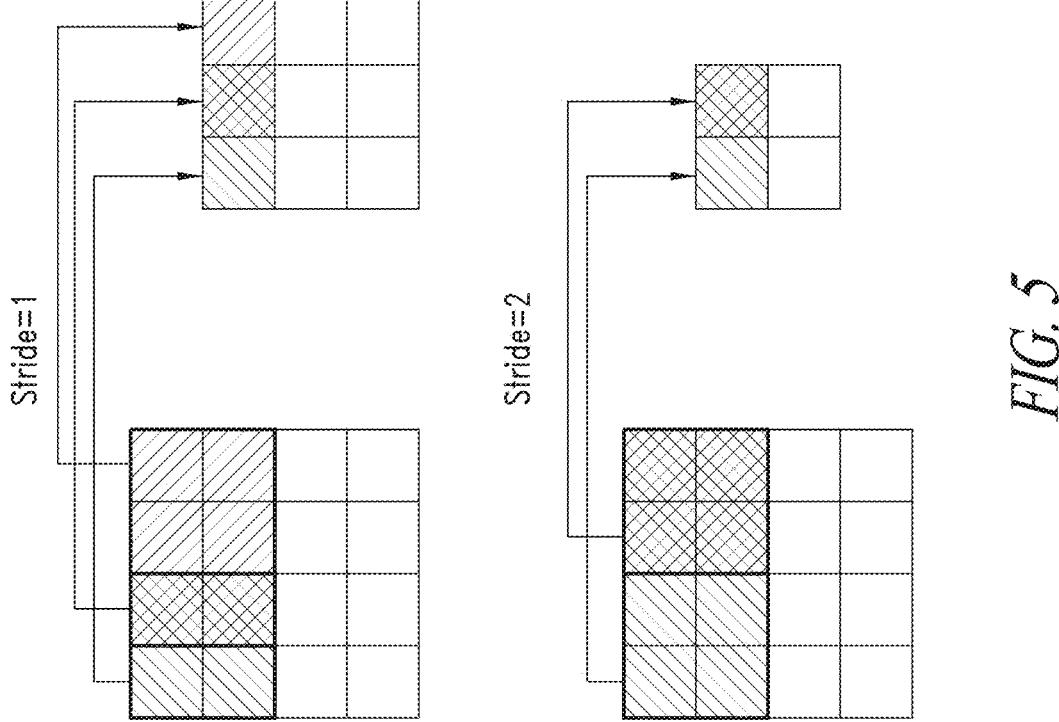
FIG. 5 is a conceptual diagram comparing a stride of 1 and a stride of 2.
Figure 6:
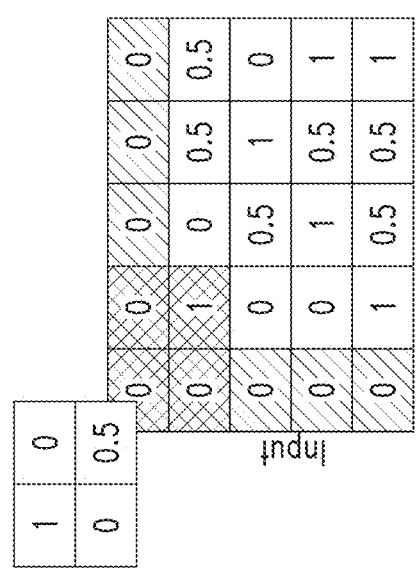
FIG. 6 is a conceptual diagram illustrating application of padding to an input feature map.
Figure 6:

Convolutional layers also may have other parameters, which may be defined for the convolutional layer, rather than learned parameters. Such parameters may be referred to as hyper-parameters. For example, a convolutional layer may have hyper-parameters including stride and padding hyper-parameters. The stride hyper-parameter indicates a step-size used to slide kernels across an input feature map. FIG. 5 is a conceptual diagram comparing a stride of 1 and a stride of 2. The padding hyper-parameter indicate a number of zeros to be added along the height, the width or the height and width of the input feature map. The padding parameters may be used to control a size of an output feature map generated by the convolution. FIG. 6 is a conceptual diagram illustrating application of padding to an input feature map.

Figure 7:
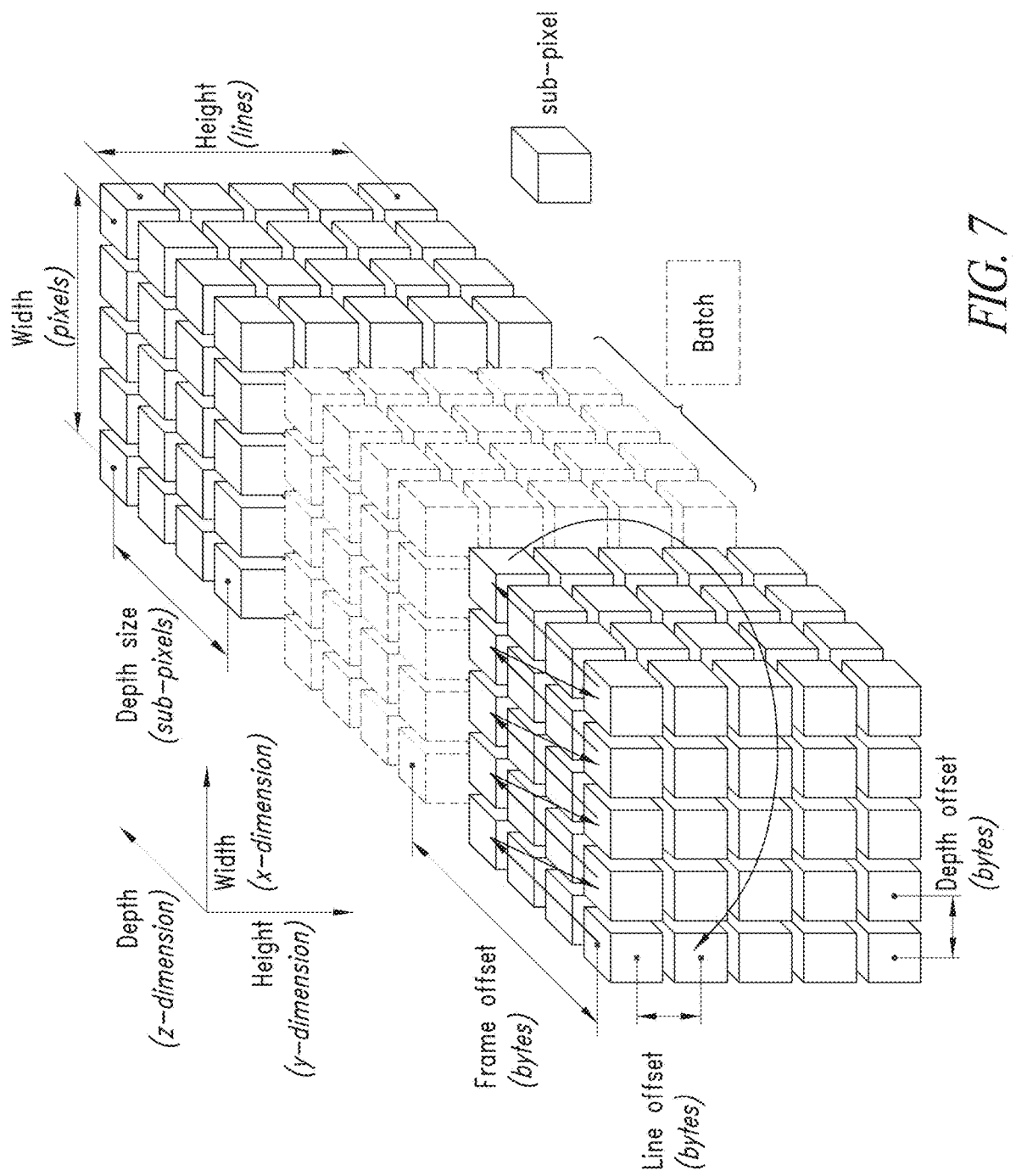
FIG. 7 is a conceptual diagram illustrating the concept of loading feature data in batches.

The feature data of a convolutional layer may have hundreds or even thousands of channels, with the number of channels corresponding to the depth of the feature data and of the kernel data. For this reason, feature and kernel data are often loaded into memory in batches. FIG. 7 is a conceptual diagram illustrating the concept of loading feature data in batches. The feature data is split along the depth dimension into batches, with each batch of feature data having the same height, width and depth. The kernel depth is generally the same as the depth of the input feature map, so similar issues are addressed by batching.

Figure 8:
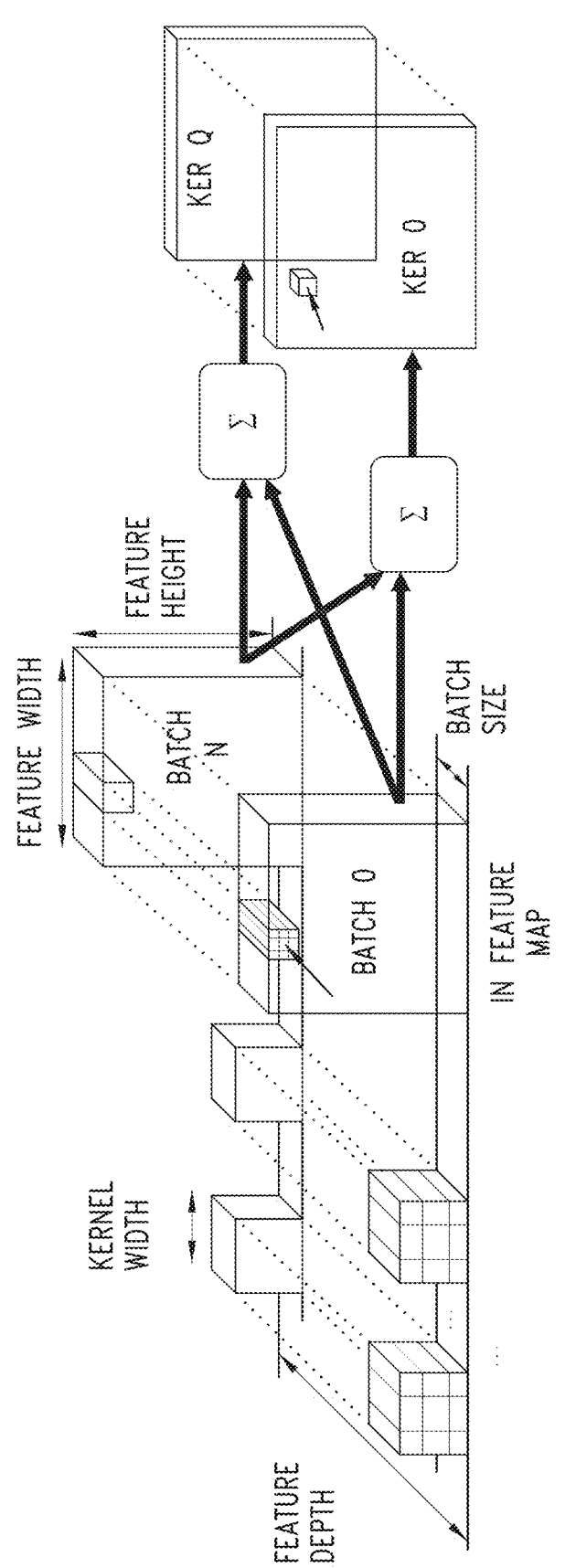
FIG. 8 is a conceptual diagram illustrating the concept of batch processing of a convolution.

As illustrated, the batches have a height of 5, a width of 5, and a depth of 4. Batches are typically written into memory sequentially, with writing of a first batch being completed before beginning the writing of a second batch. The arrows in FIG. 7 illustrate an example order in which data of a batch is written into memory. A similar batching process is typically applied to the kernel data, with each batch of the kernel data having a same kernel height and kernel width, and the same depth as the batches of feature data. Each batch of feature data is convolved with a related batch of kernel data, and a feedback mechanism is employed to accumulate the results of the batches. The conceptual diagram of FIG. 8 illustrates the concept of batch processing of a convolution.

As can be seen, the computations performed by a CNN, or by other neural networks, often include repetitive computations over large amounts of data. For this reason, computing systems having hardware accelerators may be employed to increase the efficiency of performing operations associated with the CNN.

Figure 9:
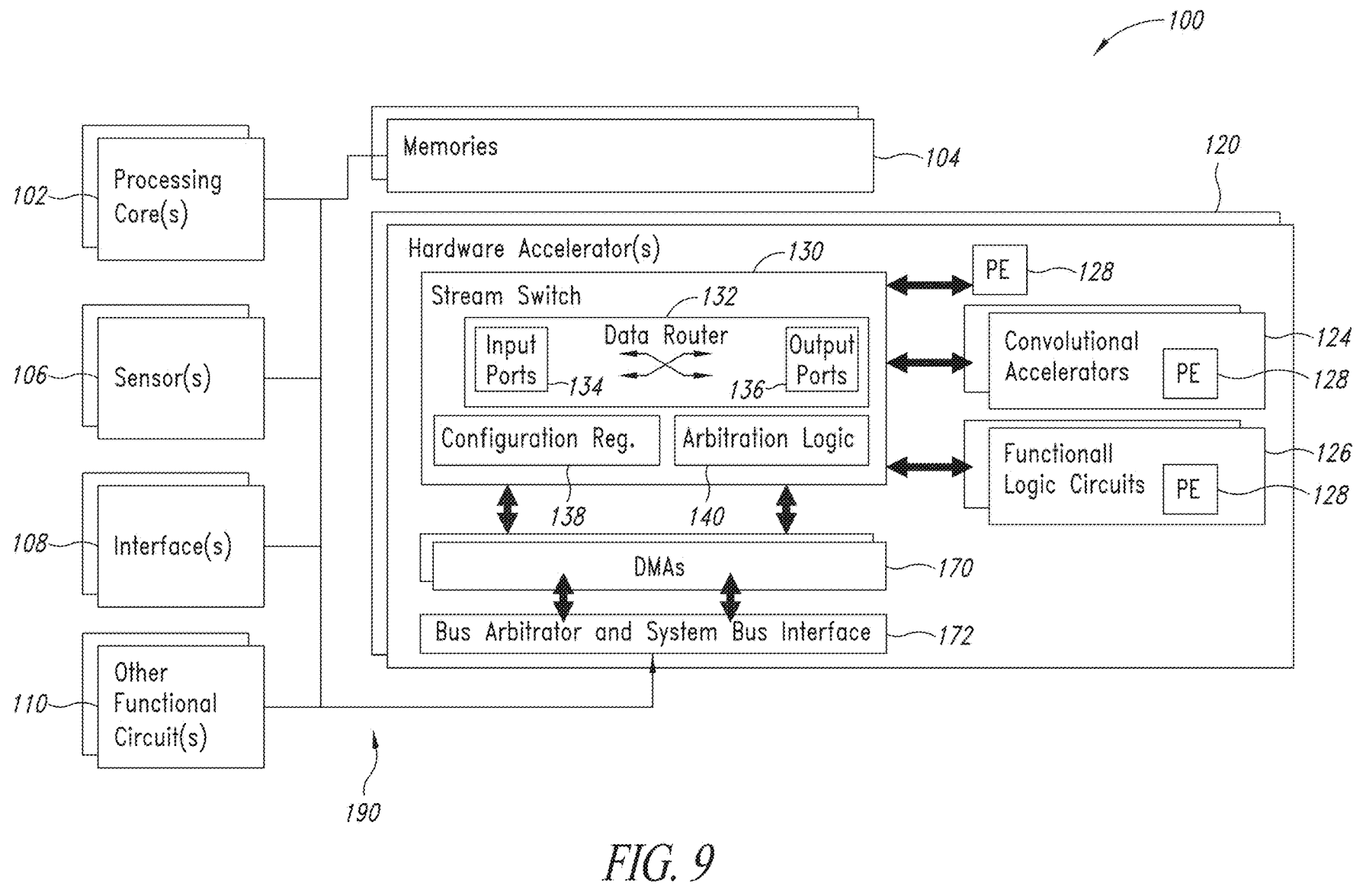

FIG. 9 is a functional block diagram of an embodiment of an electronic device or system 100 of the type to which described embodiments may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which classify images using CNNs), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, general purpose registers, etc., which, in operation, may be shared by one or more processes executed by the system 100.

The system 100 may include one or more sensors 106 (e.g., image sensors, audio sensors, accelerometers, pressure sensors, temperature sensors, etc.), one or more interfaces 108 (e.g., wireless communication interfaces, wired communication interfaces, etc.), and other functional circuits 110, which may include antennas, power supplies, one or more built-in self-test (BIST) circuits, etc., and a main bus system 190. The main bus system 190 may include one or more data, address, power, interrupt, and/or control buses coupled to the various components of the system 100. Proprietary bus systems and interfaces may be employed, such as Advanced extensible Interface (AXI) bus systems and interfaces.

The system 100 also includes one or more hardware accelerators 120 which, in operation, accelerate the performance of one or more operations, such as operations associated with implementing a CNN. The hardware accelerator 120 as illustrated includes one or more convolutional accelerators 124, one or more functional logic circuits 126, and one or more processing elements 128, to facilitate efficient performance of convolutions and other operations associated with layers of a CNN. The convolutional accelerator 120 and the other functional logic circuits 124 as illustrated also comprise one or more processing elements 128. The processing elements 128, in operation, perform processing operations, such as processing operations facilitating the performing of convolutions by a convolutional accelerator 124 or other functional operations performed by a functional logic circuit 126, or other processing operations associated with the hardware accelerator.

The hardware accelerator 120 as illustrated also includes a stream switch 130, and one or more streaming engines or DMA controllers 170. The stream switch 130, in operation, streams data between the convolutional accelerators 124, the functional logic circuits 126, the processing elements 128, and the streaming engines or DMAs 170. A bus arbitrator and system bus interface 172 facilitates transfers of data, such as streaming of data, between the hardware accelerator 120 and other components of the system 100, such as the processing cores 102, the memories 104, the sensors 106, the interfaces 108, and the other functional circuits 110, via the bus system 190.

Due to developments in silicon technology, an increasing number of processing elements, such as processing elements 128 of FIG. 9, may be employed in hardware accelerators, such as the hardware accelerator 120. Conventional bus-based architectures become a bottleneck in terms of throughput, and are not easily scalable.

A switch (e.g., a cross-bar switch) having N input links and M output links may be employed to couple the elements of the hardware accelerator (e.g., processing elements 128, DMAs 150) together. Each input link can be coupled to one or more of the output links, and each output link coupled to a single input link. The cross-bar switch can be configured at run time to provide additional flexibility. However, cross-bar switches scale in a quadradic manner, and become impractical when a large number of elements (e.g., a large number of processing elements 128) are interconnected to provide the functionality of a hardware accelerator 120. In addition, the link utilization may be low due to unbalanced traffic. These limitations may significantly impact performance in terms of area and power efficiency.

A network on a chip (NoC) may be employed instead. NoCs are widely used in large digital systems as NoCs are easily scalable and scale linearly with the number of PEs connected. Rather than connecting PEs, in a NoC paradigm, a network of routers is created within the chip and the data is packetized and routed between the inputs and outputs. NoCs employ Virtual Channels (VCs) at each input port to mitigate blocking of transmitted packets. However, the routers of NoCs become large and power-hungry when complex routing algorithms are employed, and latency is increased due to additional delay for data packetization, fault tolerance protocols, and flow/congestion control.

Figure 10:
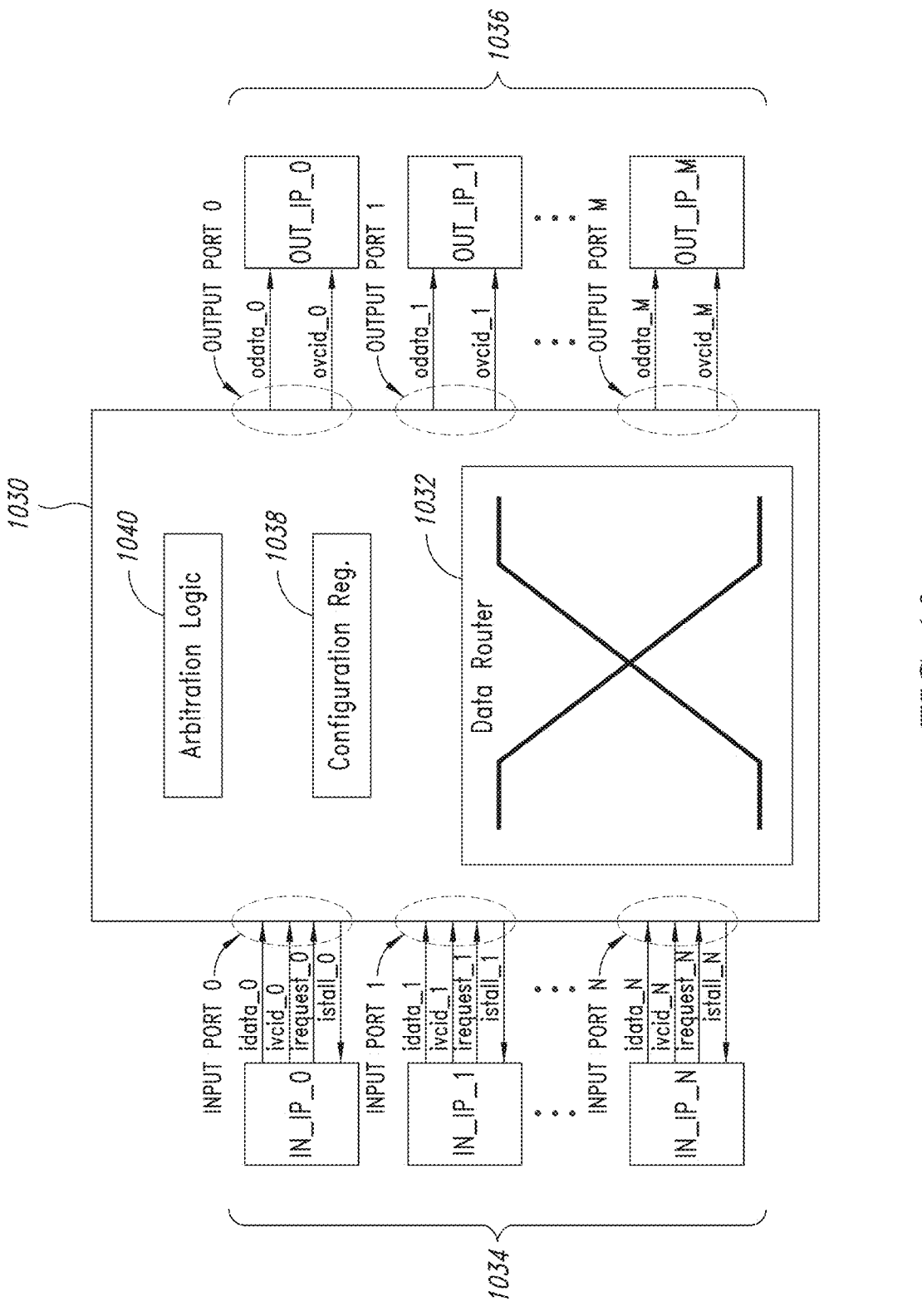
FIG. 10 is a functional block diagram illustrating an embodiment of a stream switch employing virtual channels to stream data.
Figure 11:
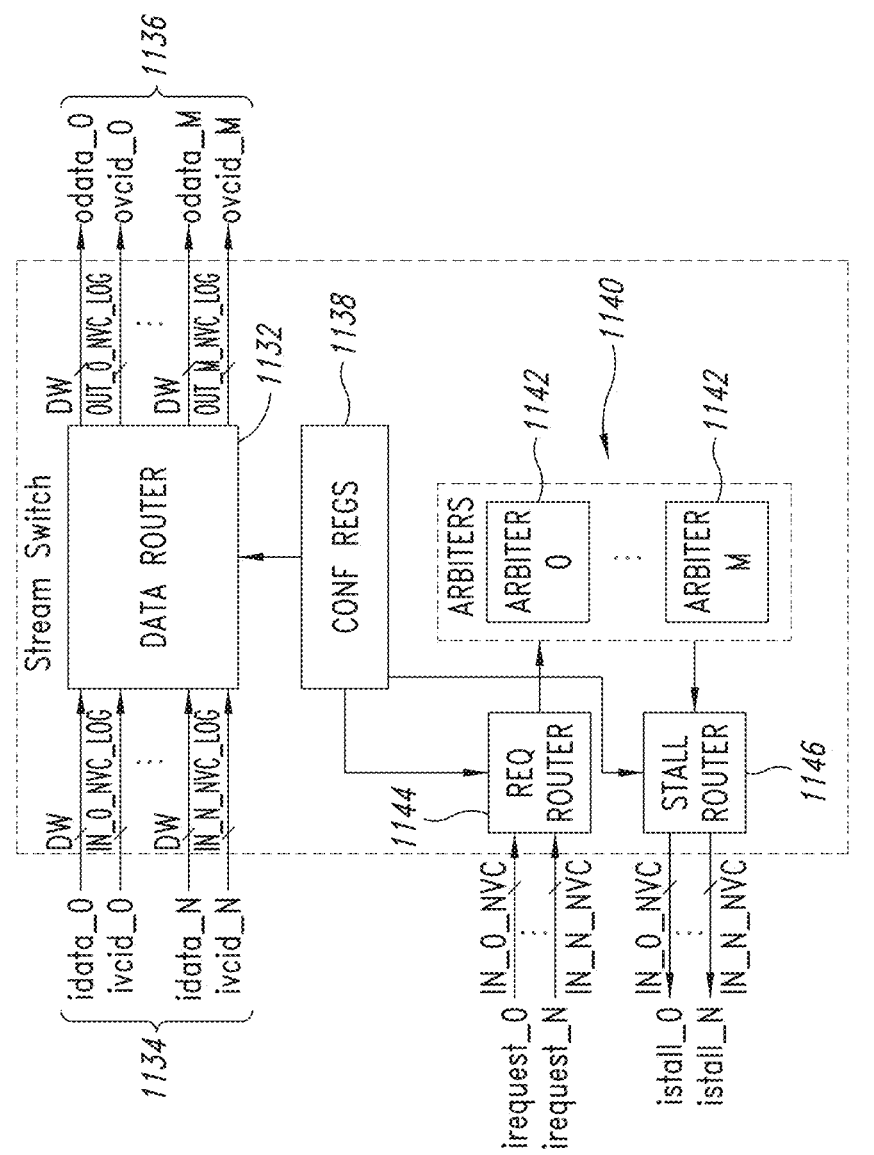
FIG. 11 is another functional block diagram illustrating an embodiment of a stream switch employing virtual channels to stream data.

To facilitate the transfer of data streams in an efficient manner in the hardware accelerator 120, the accelerator 120 includes a stream switch 130 which streams data using virtual data channels between a set of input ports (N+1 input ports as shown in the examples of FIGS. 10 and 11) and a set of output ports (M+1 output ports as shown in the examples of FIGS. 10 and 11). The use of virtual channels facilitates using the stream switch 130 to couple more source and destination IPs together than the number of available ports. In addition, employing virtual channels facilitates improving the efficiency in terms of area, power, and latency as compared to conventional crossbar and NoC switching. The stream switch 130 as illustrated includes a data router 132, which includes a number of input ports 134 and a number of output ports 136. Configuration registers 138 and arbitration logic 140 are employed to manage the allocation of bandwidth of the data router 132 to the virtual channels, as discussed in more detail below.

Embodiments of the system 100 of FIG. 9 may include more components than illustrated, may include fewer components than illustrated, may combine components, may separate components into sub-components, and various combination thereof. For example, various intellectual properties (IPs) of the hardware accelerator (e.g., the convolutional accelerators 124) may include dedicated control registers to store control information, line buffers and kernel buffers may be included in the hardware accelerator 124 to buffer feature line data and kernel data provided to the convolutional accelerators 124, etc., and various combinations thereof. In another example, cryptographic circuitry may be included in the bus arbitrator and system bus interface 170 to facilitate streaming of confidential data streams, etc. In another example, the configuration registers 138 may be combined with the arbitration logic 140, integrated into the output ports 136, etc.

FIG. 10 is a functional block diagram illustrating a stream switch 1030 using virtual channels to stream data, which may be employed, for example, as the stream switch 130 in FIG. 9. The stream switch 1030 has a data router 1032, a plurality of N+1 input ports 1034 (input ports 0 to N as illustrated), and a plurality of M+1 output ports 1036 (output ports 0 to M as illustrated). The use of virtual channels facilitates the stream switch 1030 to stream data from more than N+1 data sources to more than M+1 data destinations.

Each input port 1034 has a plurality of associated virtual input channels, each virtual input channel may be associated with a different data source (e.g., with reference to FIG. 9, an output of a streaming engine 170, an output of a convolutional accelerator 124, an output of a functional logic circuit 126, an output of a processing element 128, etc.). For each input port 1034, the stream switch 1030, in operation, receives an input data signal idata, which comprises data of a virtual input channel to be streamed via the input port, a virtual input channel ID signal ivcid, which identifies a virtual input channel associated with an active data transmission, and an access request signal irequest, which data sources associated with a virtual input channel of the input port may use to request an allocation of bandwidth. Only one virtual input channel may be actively streaming data during a clock cycle. The access request signal irequest associated with an input port 1034 may be a bitmap, with each bit indicating whether a source associated with a respective virtual input channel associated with the input port 1034 is requesting bandwidth to transmit a data stream via the input port.

Each input port 1034 outputs a stall signal istall to the data sources associated with the virtual input channels of the input port, which is used to indicate to data sources associated with respective virtual input channels when the data source may transmit a data stream via the input port of the stream switch. The stall signals istall are used to avoid data collisions. For example, when the stall signal (e.g., a bit of a stall signal istall) to a source goes high, the source stops transmission of data streams to the associated input port. When the stall signal to a source goes low, the source may commence transmission of a data stream to the associated input port. The stall signal may be a bitmap, with each bit indicating when a respective virtual input channel associated with the input port 1034 is allowed to stream data via the input port. As discussed in more detail below, a delay (e.g., a threshold number of clock cycles) may be employed, so that a source has time to prepare for a transmission. For example, a stall signal directed to a data source may go low, to indicate to the data source that the data source may use an input port for a requested transmission starting after a threshold number of clock cycles (e.g., 1 clock cycle, 2 clock cycles, etc.) has elapsed since the stall signal went low. To facilitate efficient scheduling, a common threshold number of clock cycles may typically be employed (e.g., all the sources coupled to an input port (or to any input port of a stream switch)) to determine when a source may begin transmission.

Each output port 1036 has a plurality of associated virtual output channels, each virtual output channel may be associated with a different data destination (e.g., with reference to FIG. 9, an input of a streaming engine 170, an input of a convolutional accelerator 124, an input of a functional logic circuit 126, an input of a processing element 128, etc.). Each output port 1036 outputs an output data signal odata, which comprises data streamed via the output port, and a virtual output channel ID signal ovcid, which identifies a virtual output channel associated with an active data transmission via the output port 1036.

Configuration registers 1038 associated with respective output ports 1036 store configuration information which is used, together with the requests signals irequest, to allocated bandwidth of the stream switch, as discussed in more detail below. The information stored in the configuration registers may include, for example, three fields. A first field indicates whether an output virtual channel associated with the output port is enabled. A second field indicates a source input port 1034 associated with the virtual output channel. A third field indicates a virtual input channel ID associated with the output virtual channel (e.g., the virtual input channel to be routed to the output virtual channel). Arbitration logic or circuitry 1040 uses the configuration information stored in the configuration registers, together with the irequest signals, to allocate bandwidth of the data router 1032 to the virtual channels and avoid data collisions. For example, the arbitration logic generates the istall signals to let the source IPs know when the source IP may transmit data streams via the input port to a virtual output channel.

The different virtual channels may be associated with different or the same types of data streams, different or the same sources of data streams, different or the same destinations of data streams, etc., and various combinations thereof. The use of virtual channels and the configuration information also facilitates using multiple virtual channels to transmit data streams over the same physical links, while allowing the destinations to correctly identify the source and type of data streams being streamed. In addition to reducing the number of physical links needed, the area savings from the reuse of the physical links also facilitates making the channels wider.

FIG. 11 is a functional block diagram of another embodiment of a stream switch 1130, that may be employed, for example, as the stream switch 130 of FIG. 9. The stream switch 1130 as illustrated comprises a data router 1132, configuration registers 1138, arbitration logic 1140, a request signal router 1144, and a stall signal router 1146.

The data router 1132 includes a plurality of N+1 input ports 1134 and a plurality of M+1 output ports 1136, and, in operation, for a given input port of the plurality of input ports, streams data of a virtual input channel to one or more output ports of the plurality of output ports. Each of the input ports 1134 has a respective input data line to receive a respective input data signal idata. The input data lines may have a number of bits corresponding to a data width DW of the input port. The input ports 1034 also have a respective virtual input channel ID line to receive a virtual input channel ID ivcid associated with current data received on the input data line of the input port 1034. The virtual input channel ID lines may have a bit width equal to $\log_2$ (In_x_NVC), where In_x_NVC is the number of virtual input channels of the corresponding input port 1134.

Each of the M+1 output ports 1136 has a respective output data line to provide a respective output signal odata. The output data lines may have a number of bits corresponding to a data width DW of the output port. The output port 1136 also has a respective virtual output channel ID line to output a virtual output channel ID ovcid associated with current output data of the output port. The virtual output channel ID line may have a bit width equal to $\log_2$(OUT_x_NVC), where OUT_x_NVC is the number of virtual output channels of the corresponding output port 1136.

The configuration registers 1138, in operation, store configuration information associated with the respective output ports 1136 of the plurality of output ports. The arbitration logic 1140, as illustrated, comprises a plurality of arbitrators 1142, each arbitrator corresponding to a respective output port 1138 of the plurality of M+1 output ports. The stream switch 1130 as illustrated also includes a request router 1144 and a stall router 1146.

For each input port 1134, the request router 1144 receives requests to stream data from or associated with data sources (e.g., with reference to FIG. 9, a request to stream data from an output of a streaming engine 170, an output of a convolutional accelerator 124, an output of a functional logic circuit 126, an output of a processing element 128, etc., associated with a respective virtual input channel ID) and a virtual input channel associated with the input port 1134. The request router 1144 as illustrated has a number of request signal input lines irequest, as illustrated N+1 lines, each having a bit width equal to a number of virtual input channels associated with a respective input port. The irequest signals may be bitmaps, with each bit corresponding to a respective virtual input channel (and source) of the input port.

The stall router 1146 outputs stall signals to the data sources associated with virtual input channels, to control the transmission of data streams by the data source in accordance with bandwidth allocations of the arbitration logic 1140. The stall router 1146 as illustrated has a number N+1 stall signal output lines istall, each having a bit width equal to a number of virtual input channels associated with a respective input port. The istall signals may be bitmaps, with each bit corresponding to a respective virtual input channel (and source) of the input port.

The arbitration logic 1140, in operation, allocates bandwidth of the data router 1132 to virtual output channels based on the received request signals irequest and the configuration information associated with the output ports 1136 and stored in the configuration registers, for example, as discussed in more detail below.

Embodiments of the stream switch 1030 of FIG. 10 and of the stream switch 1130 of FIG. 11 may include more components than illustrated, may include fewer components that illustrated, may combine components or split components in various manners, may transmit additional signals, etc., and various combinations thereof. For example, other signals may be employed and transmitted via the data router 1032, such as signals indicating whether data is valid, etc.

Figure 12:
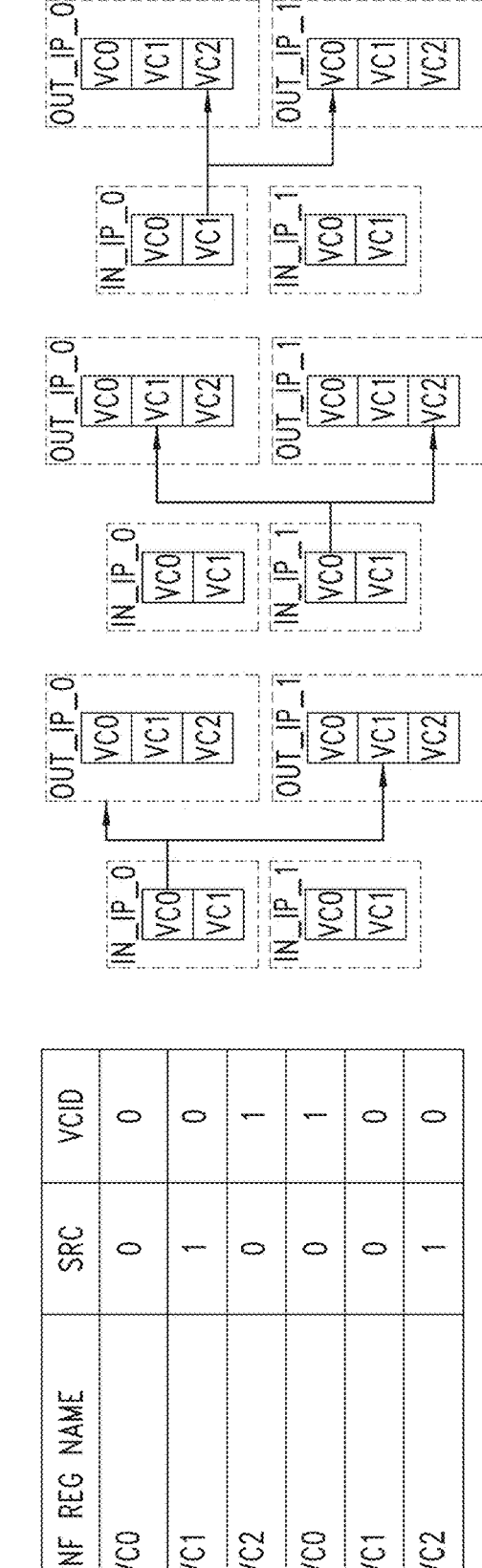
FIG. 12 is a conceptual diagram illustrating example embodiments of data structures storing configuration information associated with an output port of a stream switch.

FIG. 12 is a conceptual diagram illustrating example embodiments of data structures storing configuration information associated with an output port of a stream switch, and will be described for convenience with reference to FIG. 11. In the illustrated examples, the data router 1132 is assumed to have two input ports 1136 (input ports IN_IP 0 and IN_IP_1) with two virtual input channels per input port (VC0 and VC1), and two output ports 1138 (output ports OUT_IP_0 and OUT_IP_1) with three virtual output channels per output port (VC0, VC1 and VC2). Each output port has three associated configuration registers 1202, one configuration register for each virtual output channel associated with the output port.

As illustrated, a first configuration register is associated with virtual output channel VC0 of output port 0, and stores a source input port, as indicated input port 0, and a virtual input channel ID associated with input port 0, as indicated VC0. A second configuration register is associated with virtual output channel VC1 of output port 0, and stores a source input port, as indicated input port 1, and a virtual input channel ID associated with input port 1, as indicated VC0. A third configuration register is associated with virtual output channel VC2 of output port 0, and stores a source input port, as indicated input port 0, and a virtual input channel ID associated with input port 0, as indicated VC1. A fourth configuration register is associated with virtual output channel VC0 of output port 1, and stores a source input port, as indicated input port 0, and a virtual input channel ID associated with input port 0, as indicated VC1. A fifth configuration register is associated with virtual output channel VC1 of output port 1, and stores a source input port, as indicated input port 0, and a virtual input channel ID associated with input port 0, as indicated VC0. A sixth configuration register is associated with virtual output channel VC2 of output port 1, and stores a source input port, as indicated input port 1, and a virtual input channel ID associated with input port 1, as indicated VC0.

Data flow is mapped from the virtual input channels of the input ports to the virtual output channels of the output ports. The example configuration information stored in the configuration registers 1202 maps:

virtual input channel 0 of input port 0 to virtual output channel 0 of output port 0 and to virtual output channel 1 of output port 1;

virtual input channel 1 of input port 0 to virtual output channel 2 of output port 0 and to virtual output channel 0 of output port 1; and virtual input channel 0 of input port 1 to virtual output channel 1 of output port 0 and to virtual output channel 2 of output port 1. Other configuration information producing different data flow mappings may be employed.

Figure 13:
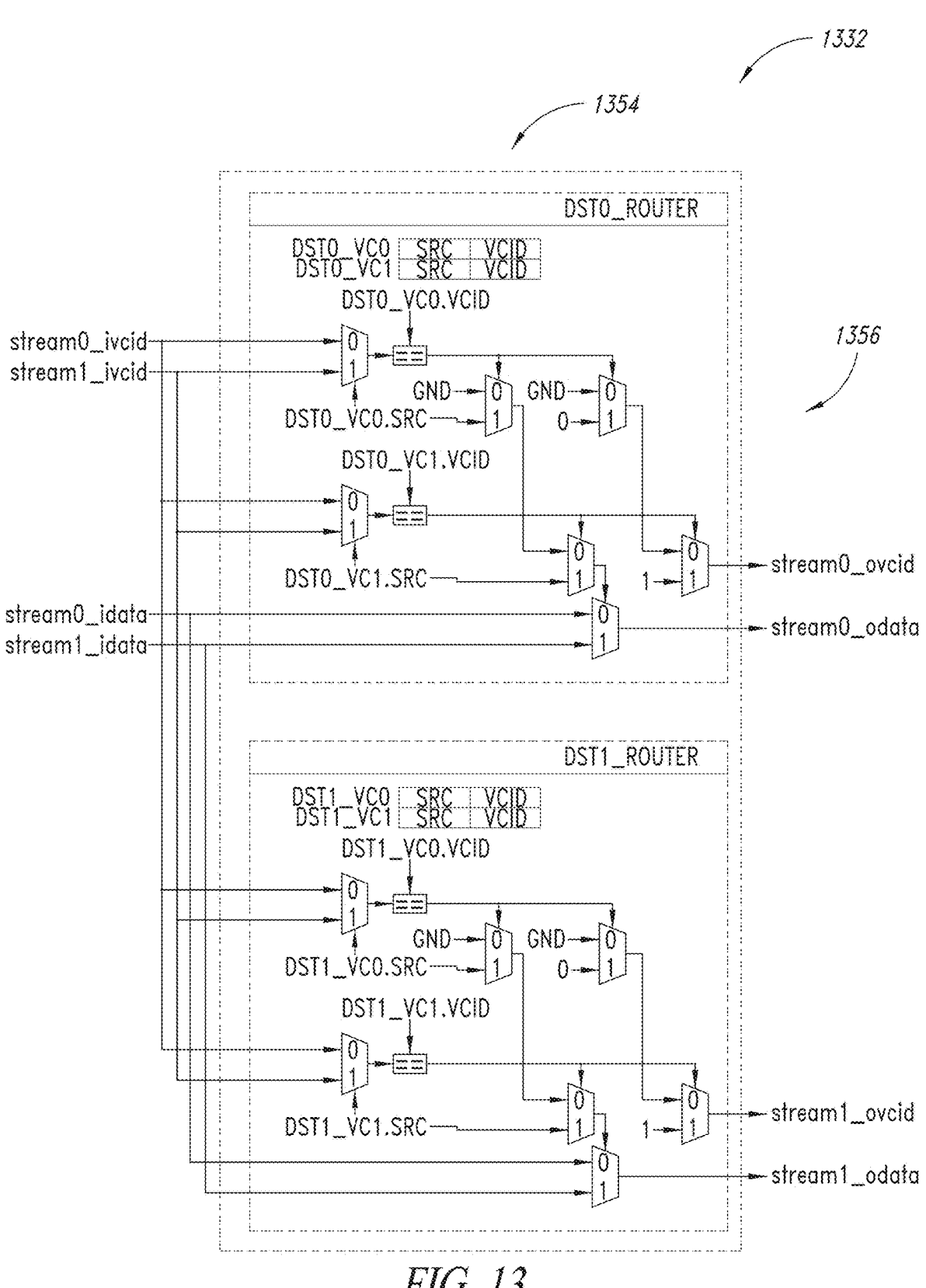
FIG. 13 is a conceptual diagram illustrating an example of using routing circuitry to route data streams based on the configuration information stored in configuration registers.

FIG. 13 is a conceptual diagram illustrating using example destination routing circuitry 1354 to route data streams based on the configuration information stored in the configuration registers. The destination routing circuitry 1354 may be employed in an embodiment of a data router 1332 that may be employed, for example, as the data router 1132 in FIG. 11. In the illustrated example, the data router 1332 has two physical input ports, each having two virtual input channels, and two physical output ports, each having two physical output channels. The destination routing circuitry 1354 comprises a network of multiplexers and comparators 1356. The routing circuitry 1354 controls the multiplexers of the network based on the stored configuration information. The input data streams received at the input ports, as illustrated stream0_idata and stream1_idata, are routed to the output port ports as output data streams, as illustrated stream0_odata and stream1_odata, based on the virtual channel IDs associated with the respective data streams, as illustrated, stream0_ivcid and stream1_ivcid, and the configuration information stored in the configuration registers.

Figure 14:
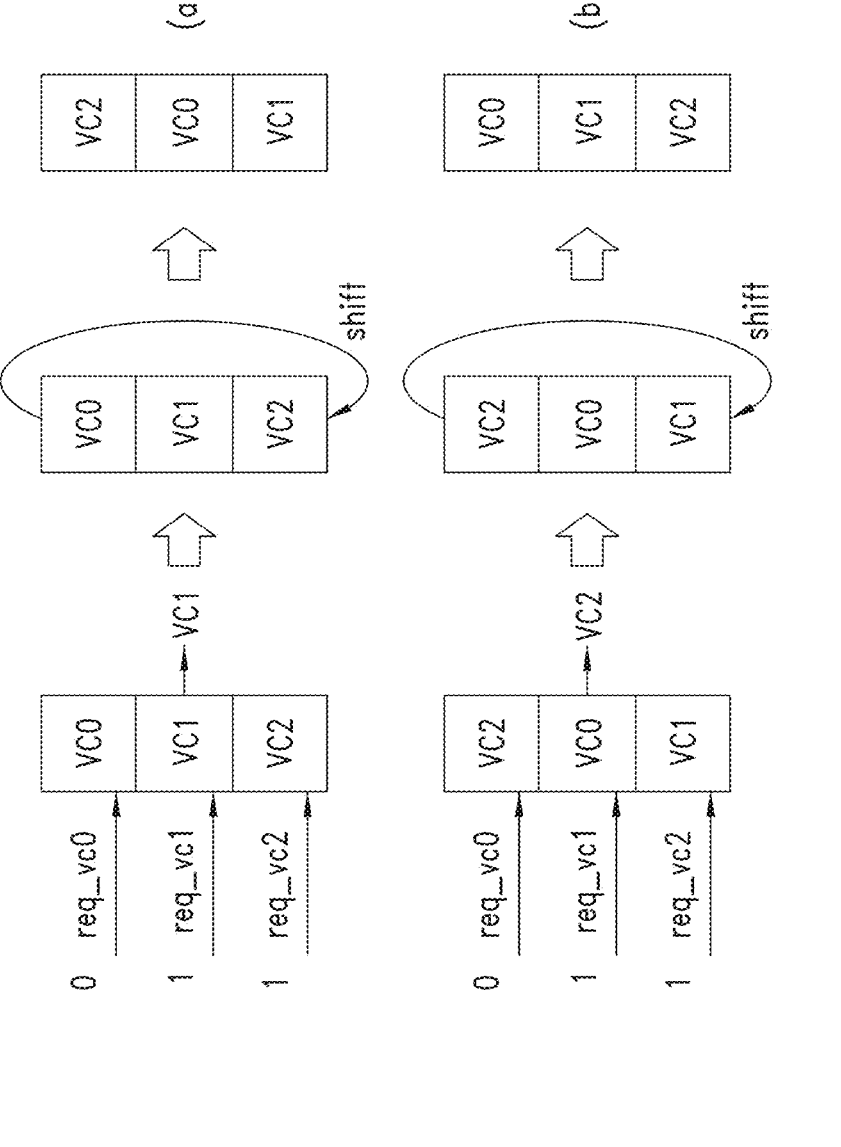
FIG. 14 is a conceptual diagram illustrating an example arbitration scheme that may be employed by embodiments of a stream switch to allocate bandwidth to virtual data channels.

The arbitration logic employs an arbitration scheme to allocate bandwidth to the output virtual channels (e.g., to generate the stall signals which are routed to the input virtual channels through the input ports). FIG. 14 is a conceptual diagram illustrating example application of an arbitration scheme that may be employed by a stream switch to allocate bandwidth to virtual data channels. In the example of FIG. 14, a round robin scheme is employed, which operates on the principle that a request which was just served has a lower priority that previously served requested in the next arbitration round. In example (a), active requests to stream data are received by the virtual output channel VC1, and by the virtual output channel VC2. Virtual output channel VC1 has a higher priority, and thus the bandwidth is allocated to virtual output channel VC1 in the next allocation cycle. The priority for a subsequent allocation cycle is shifted, and virtual output channel VC2 has the highest priority for the subsequent allocation cycle. In example (b), active requests are received by the virtual output channel VC1, and by the virtual output channel VC2. Virtual output channel VC2 has a higher priority, and thus the bandwidth is allocated to virtual output channel VC2 in the next allocation cycle. The priority for a subsequent allocation cycle is shifted, and virtual output channel VC0 has the highest priority for the subsequent allocation cycle. Other arbitration schemes may be employed (e.g., prioritization of data types sources, weighted round robin schemes, etc., and various combinations thereof).

Figure 15:
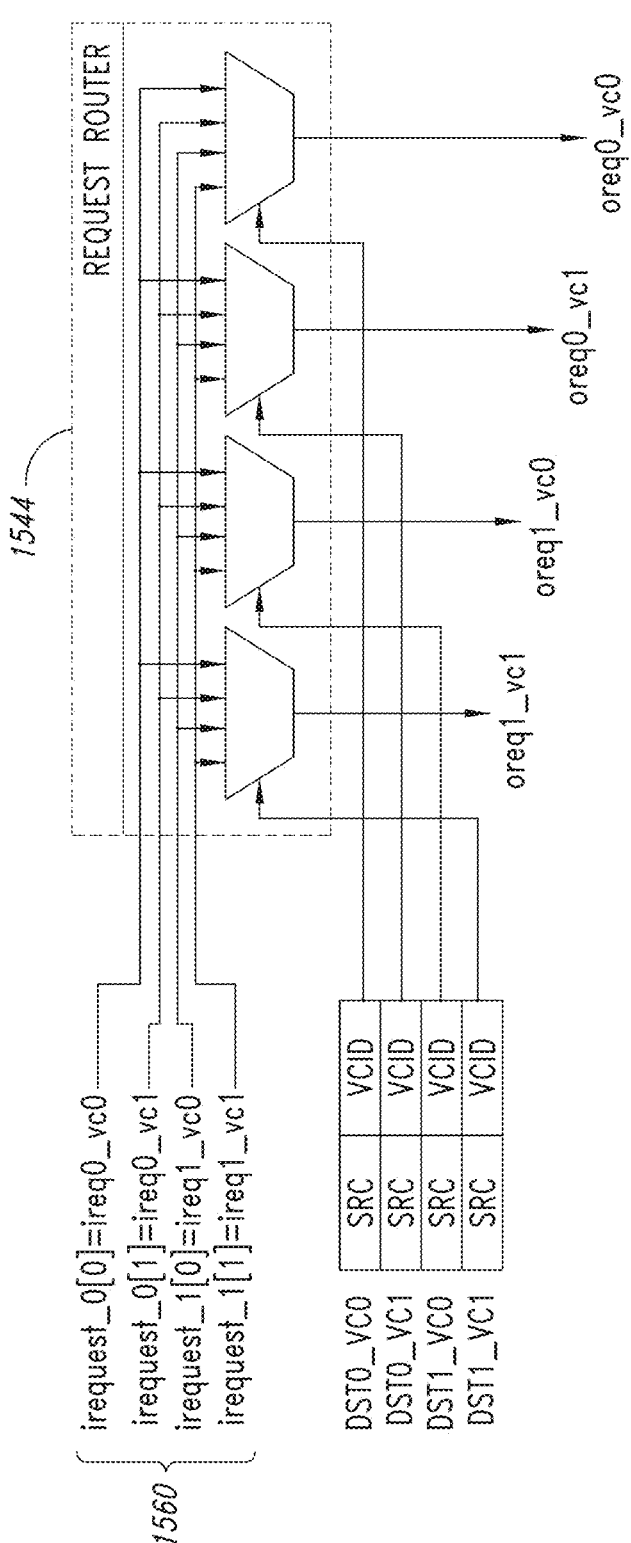
FIG. 15 is a functional block diagram of an embodiment of a request router according to an embodiment.

As discussed above, bandwidth is allocated to virtual output data channels of an output port based on request signals associated with virtual input data channels. FIG. 15 is a functional block diagram of an embodiment of a request router 1544 that may be employed, for example, as the request router 1144 of FIG. 11, and for convenience will be described with reference to FIG. 11. The request router 1544 comprises a plurality of multiplexers 1558, which in operation, route the received request signals 1560 associated with virtual input channels of the input ports 1134 to arbitrators 1142 associated with respective output ports 1136 based on the configuration data stored in the configuration registers 1138. As illustrated, the request router 1544 generates two request signals oreq0_vc1, oreq0_vc0 directed to an arbitrator 1142 associated with output port 0, and two request signals oreq1_vc1, oreq1_vc0 directed to an arbitrator 1142 associated with output port 1. In other words, the request signals serve as an indicator to an arbitrator of whether a source has requested a slot to stream data to a virtual output channel of an output port.

Figure 16:
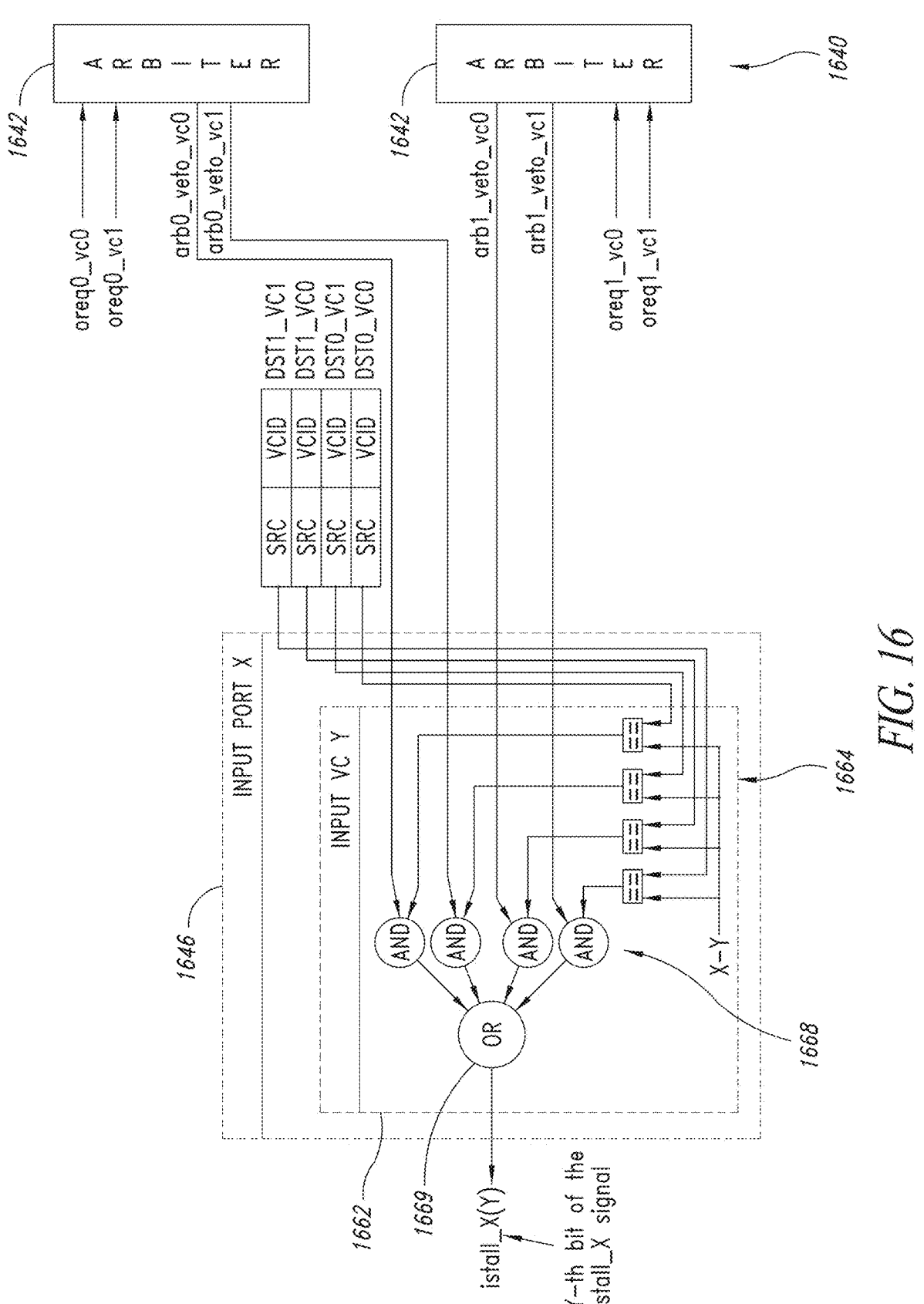
FIG. 16 is a conceptual diagram illustrating the generation of stall signals by a stream switch.

As discussed above, stall signals istall are used to prevent sources (e.g., with reference to FIG. 9, an output of a DMA 170, an output of a convolutional accelerator 124, an output of another functional logic circuit 126, an output of a processing element 128) from transmitting data to the stream switch in a time slot unless the slot is allocated to the source by the arbitration circuitry. In other words, the stall signals istall are used to avoid collisions. FIG. 16 is conceptual diagram illustrating the generation of stall signals istall by a stream switch, and for convenience will be described with reference to FIG. 11. FIG. 16 assumes a stream switch having two output ports with two virtual output channels associated with each output port. No restriction is assumed with respect to the number of virtual input channels.

The arbitration circuitry 1640 includes two arbitrators 1642, one arbitrator is associated with a first output port and one arbitrator is associated with a second output port. It is possible that the two arbitrators will allocate bandwidth to the output ports in a manner which creates a data collision at an input port (e.g., in a manner authorizing a first source associated with a first virtual channel of an input port and a second source associated with a second virtual input channel of the input port to use a same time slot), and possible loss of data. To avoid such collisions and data losses (or the need to use buffers to avoid the data losses), the arbitrators 1642 generate veto signals based on the request signals routed to the arbitrators. For each virtual input channel of each input port, the stall router 1646 includes stall signal generation circuitry 1662, which generates a bit of a stall signal associated with the virtual channel of the input port based on the veto signals and the configuration information associated with the output ports and stored in the configuration registers. As illustrated, the stall signal generation circuitry 1662 includes comparators 1664, which, in operation, compare the configuration information to the port and virtual channel information to generate an indication of whether a collision is possible (e.g., identifies pertinent virtual input channels), AND gates 1668, which combine the outputs of the comparators 1664 with the veto signals, and an OR gate 1669, which combine the outputs of the AND gates. The veto signals may be generated using one-cold coding. For example, if the arbitrator for the first output port selects virtual input channel 0, the veto signal for the selected virtual input channel is not asserted (e.g., low), and the arbitrator asserts veto signals (e.g., high) for each of the other virtual input channels.

In operation, a source may request a slot to transmit a data stream because the source has data ready to transmit. The source waits until a stall signal generated by the stall router 1662 and associated with the source goes low (e.g., a bit of a stall signal istall), indicating the source may begin transmission after a delay. The source begins to transmit data of the data stream and keeps the request signal high until there is no more data to transmit. The source continues to transmit data of the data stream until either there is no more data for the source to transmit (in which case the request signal of the source goes low), or the stall signal associated with the source goes high. The threshold delay would typically be the same for sources of data for the stream switch (e.g., two clock cycles).

Figure 17:
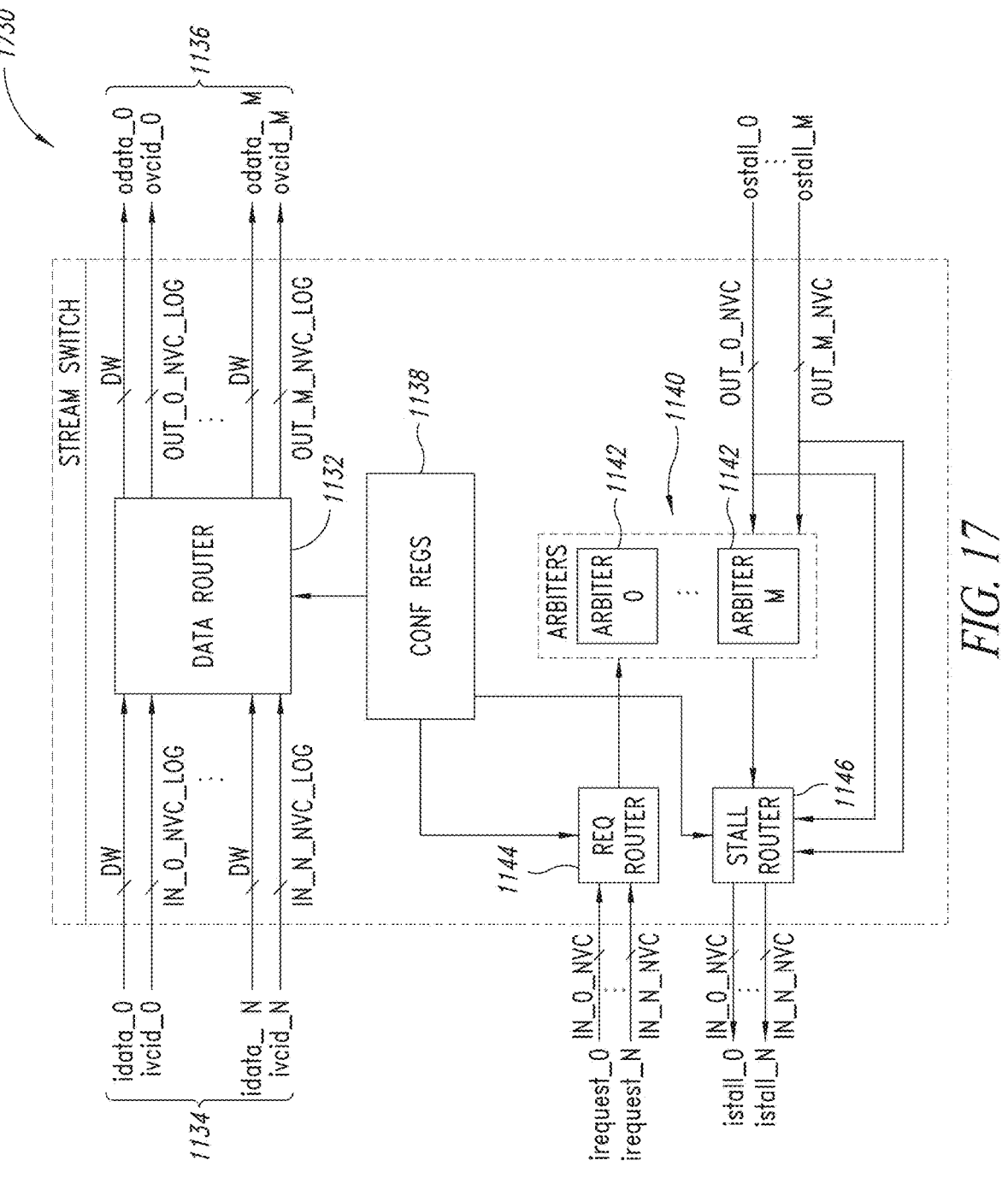
FIG. 17 is a functional block diagram of an embodiment of a stream switch utilizing backpressure signals from destinations to allocate bandwidth.

Sometimes a destination may not be ready to receive data. For example, a buffer of a destination may be full or otherwise not able to process data. FIG. 17 illustrates an embodiment of a stream switch 1730, which facilitates the use of backpressure signals associated with destinations to prevent the stream switch from allocating bandwidth to stream data to a destination which is not ready to receive a data stream. The stream switch 1730 may be employed, for example, as the stream switch 130 of FIG. 9, and is similar in many respects to the embodiment of a stream switch 1130 illustrated in FIG. 11. The stream switch 1730 receives output stall signals ostall associated with respective output ports of the stream switch. The output stall signals may be bitmaps, which each bit corresponding to a respective virtual output channel associated with the output port. The output stall signals are provided to the arbitrators and to the stall router, and used to arbitrate the allocation of bandwidth and to generate the input stall signals istall.

Figure 18A:
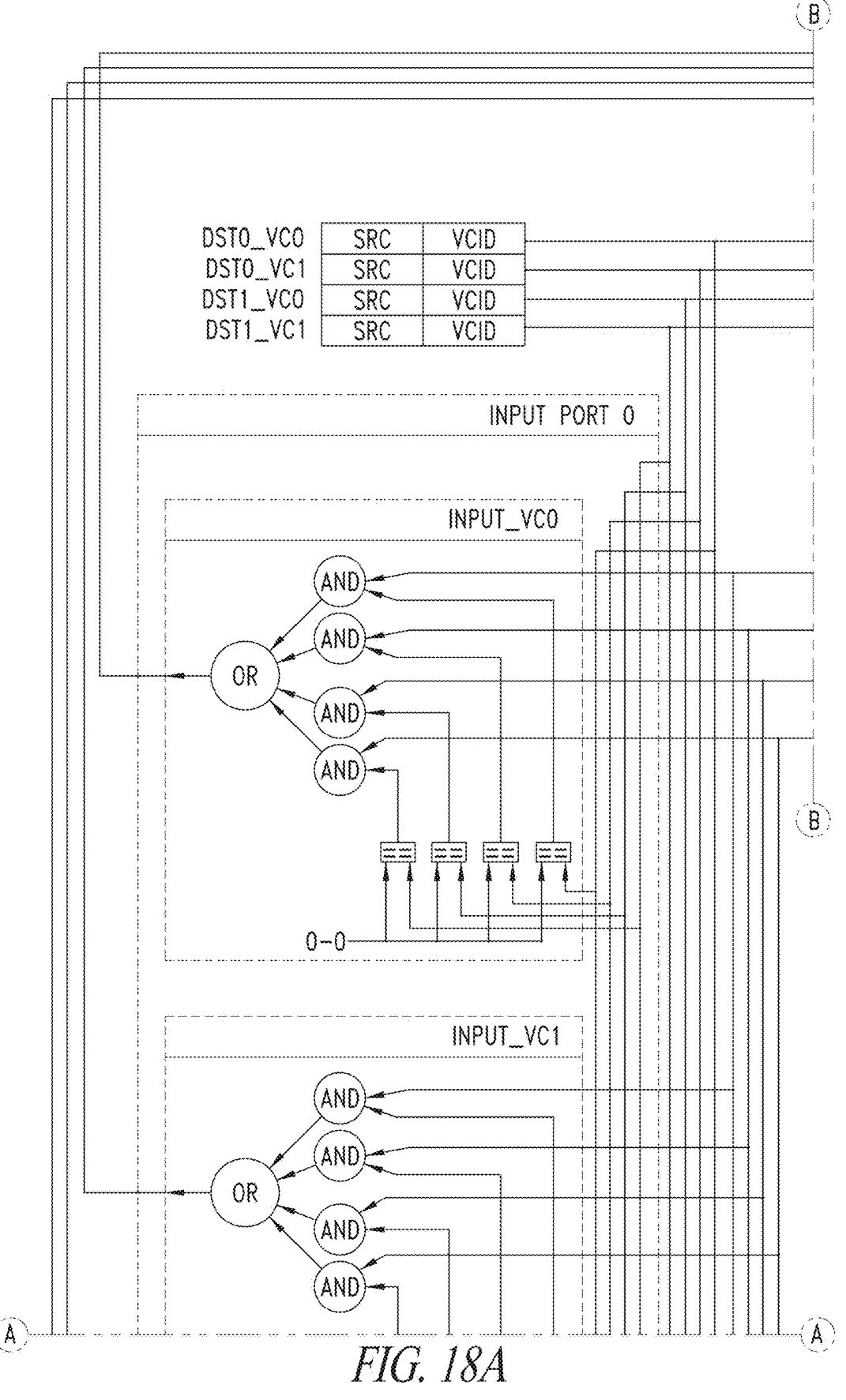
FIGS. 18A, 18B and 18C are a conceptual diagram illustrating the allocation of bandwidth and the generation of stall signals by a stream switch based on backpressure signals from destinations.
Figure 18B:
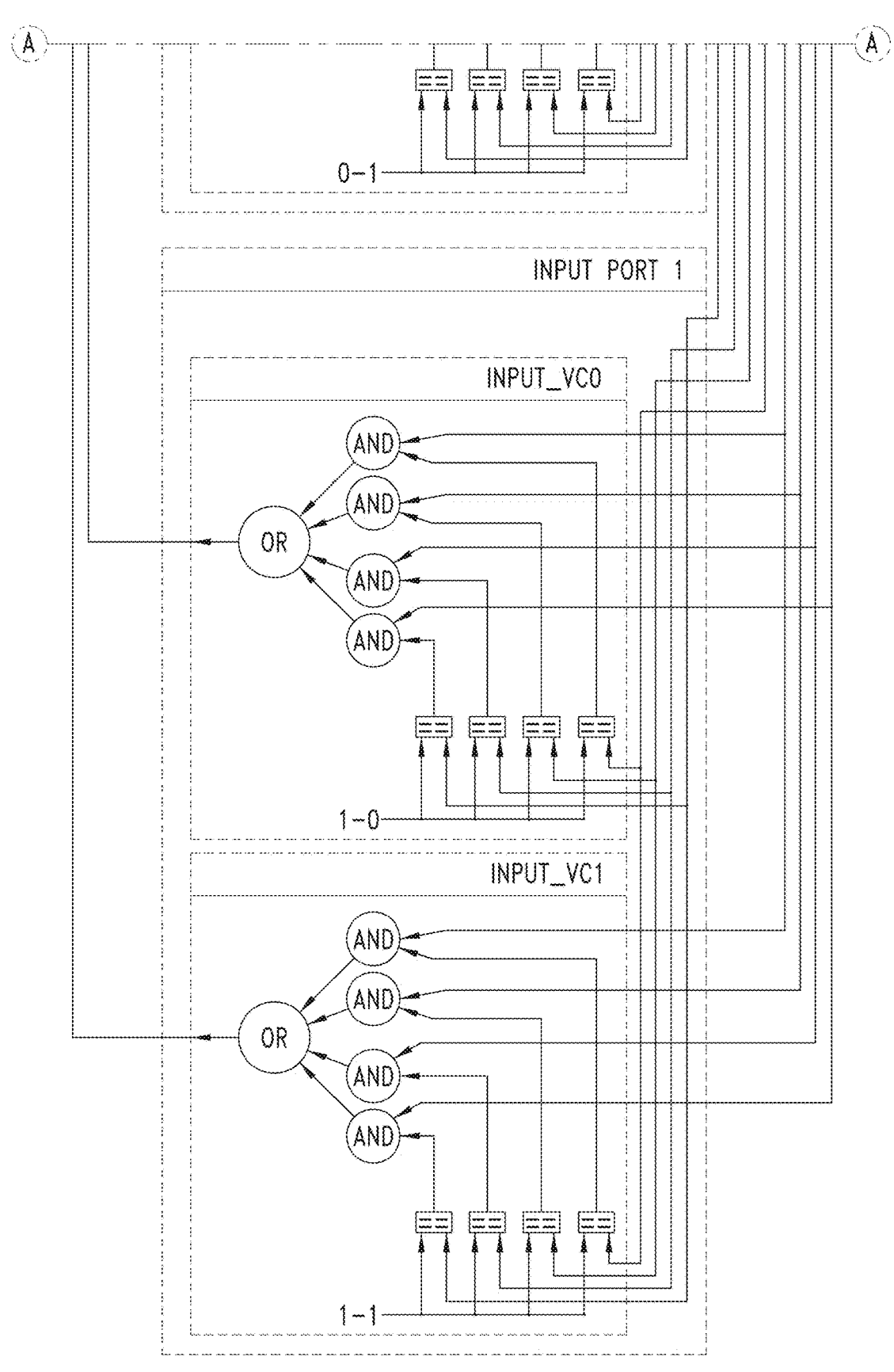
Figure 18C:
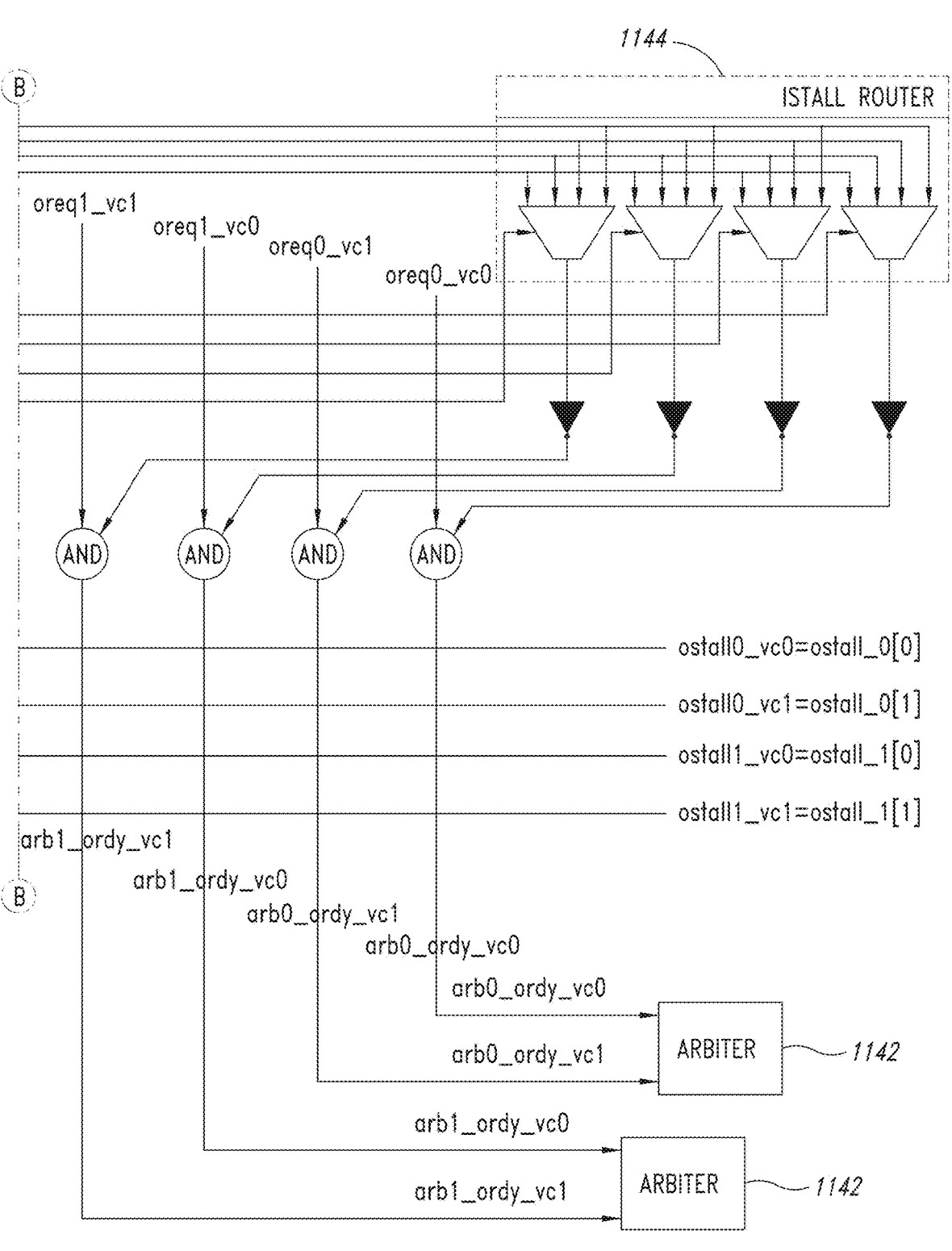

FIGS. 18A, 18B and 18C, collectively FIG. 18, are a conceptual diagram illustrating the allocation of bandwidth and the generation of stall signals by a stream switch based on backpressure signals associated with streaming destinations, and for convenience will be described with reference to FIG. 17. FIG. 18 assumes a stream switch having two output ports with two virtual output channels associated with each output port, and two input ports with two virtual input channels associated with each input port. The received output stall signals ostall are provided to the stall router 1146 and used to generate the input stall signals together with the veto signals and the configuration information stored in the configuration registers. For ease of illustration, the veto signals are omitted from FIG. 18 (see FIG. 16 for an example illustration of the veto signal couplings). The request signals generated by the request router 1144 (see FIG. 15) are combined with an inverse of the input stall signals, and the combined signal is provided to the arbitrators for use in allocating bandwidth of the stream switch. This facilitates avoiding the allocation of bandwidth to virtual output channels which are not ready to receive data.

Conflicts may arise in multicast situations. As illustrated in FIG. 12, sometimes a data flow associated with a virtual input channel is mapped to multiple virtual output channels associated with different output ports (multicasting). As the arbitration decisions associated with respective output ports are decoupled from each other, conflicts between the arbitrators may arise. For example, in FIG. 12 virtual input channel 0 of input port 0 is mapped to virtual output channel 0 of output port 0 and to virtual output channel 1 of output port 1. An arbitrator associated with output port 0 may allocate a starting time slot to virtual input channel 0 of input port 0 to stream data to virtual output channel 0 of output port 0, while an arbitrator associated with output port 1 does not allocate the same starting time slot to virtual input channel 0 of input port 0 to stream data to virtual output channel 1 of output port 1. Because the arbitrator associated with output port 1 has not selected virtual input channel 0 of input port 0 for the starting time slot, the arbitrator associated with output port 1 asserts a veto signal with respect to virtual input channel 0 of input port 0. The result is that virtual input channel 0 loses the time slot allocated by the arbitrator associated with output port 0. This may be described as a conflict between the arbitrators on an output link on which bandwidth has been assigned to a virtual input channel.

Figure 19:
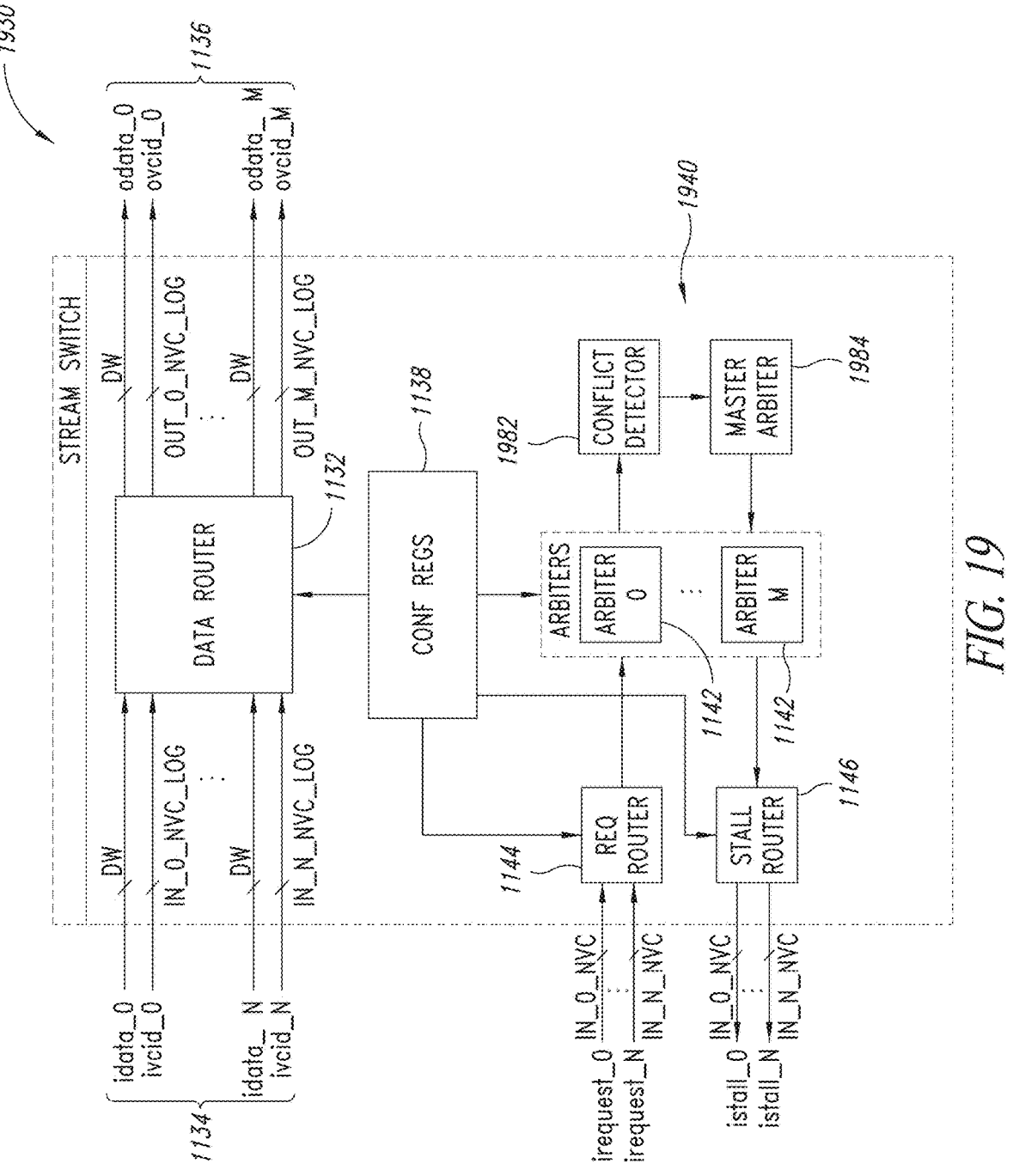
FIG. 19 is a functional block diagram of an embodiment of a stream switch including a master arbitrator.

FIG. 19 illustrates an embodiment of a stream switch 1930, which facilitates addressing conflicts between arbitrators, and which may be employed, for example, as the stream switch 130 of FIG. 9, and is similar in many respects to the embodiment of a stream switch 1130 illustrated in FIG. 11. The arbitration circuit 1940 of the stream switch 1930 of FIG. 19 also includes conflict detection circuitry 1982 and a master arbitrator 1984. The conflict detection circuitry 1982, in operation, detects conflicts between arbitrators 1142 of the arbitration circuitry 1140, such as when allocations of starting time slots by different arbitrators associated with a virtual input channel of an input port are inconsistent with a data mapping associated with the virtual input channel. The master arbitrator 1984, in operation, resolves the conflict, which facilitates avoiding the loss of data slots when a conflict arises.

Figure 20:
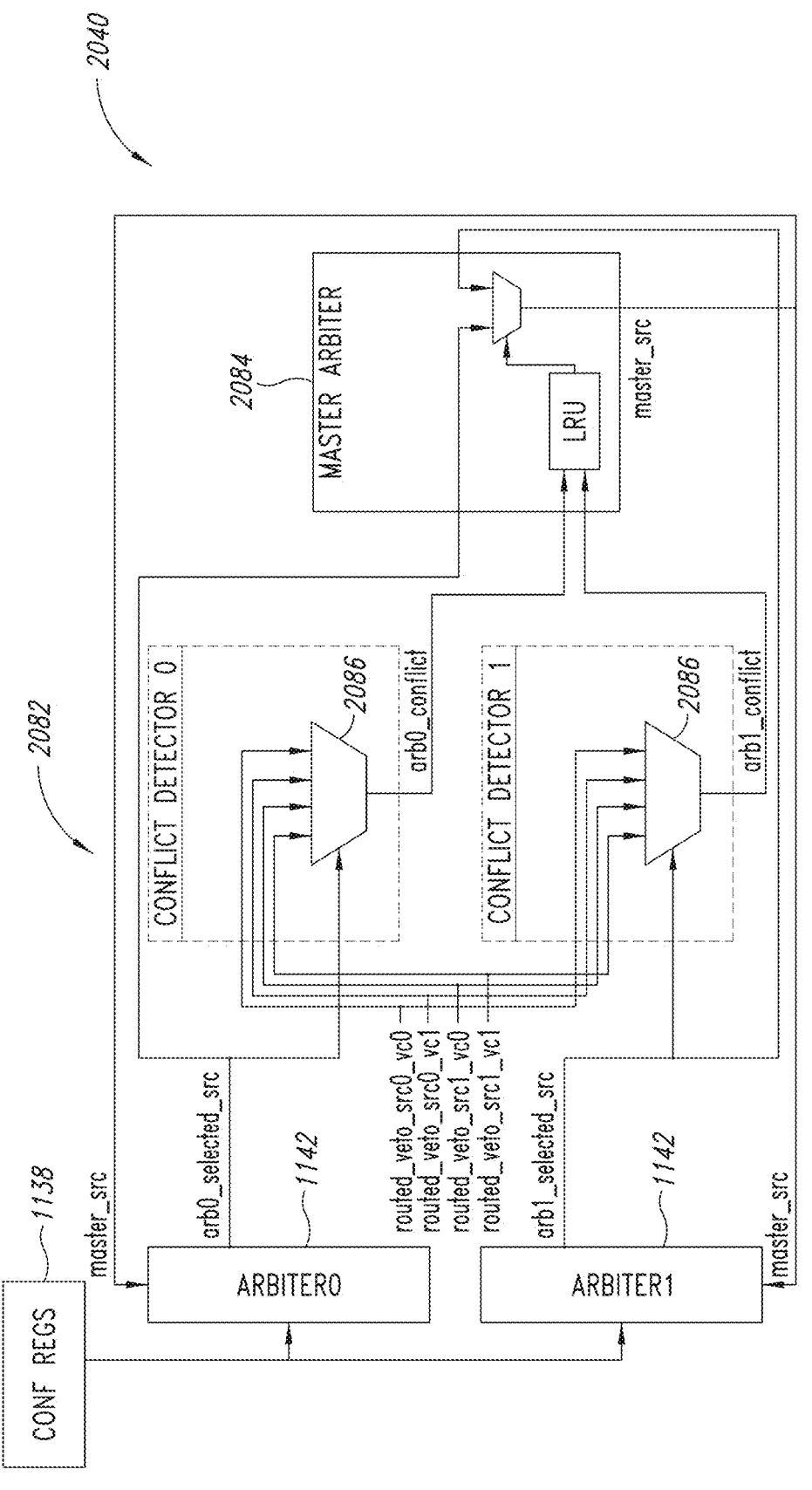
FIG. 20 is a functional block of embodiments of conflict detection circuitry and a master arbitrator that may be employed in an embodiment of a stream switch.

FIG. 20 illustrates an embodiment of arbitration circuitry 2040 which includes conflict detection circuitry 2082 and a master arbitrator 2084, which may be employed, for example, as the arbitration circuitry 1940 of the stream switch 1930 of FIG. 19. For convenience, FIG. 20 will be described with reference to FIG. 19. For each arbitrator 1142, multiplexing circuitry 2086, as illustrated, a multiplexer, is employed to detect conflicts between an arbitration decision of the respective arbitrator 1142 and arbitration decisions of other arbitrators 1142 of the arbitration circuitry 1940. The multiplexing circuitry 2086 is controlled based on the arbitration decision of the respective arbitrator 1142, and generates an output signal indicative of whether there are any conflicting arbitration decisions of other arbitrators. For ease of illustration, only two arbitrators 1142 associated with respective output ports 1136 are illustrated in FIG. 20. Embodiments may employ more than two output ports 1136, and thus more than two arbitrators 1142.

The master arbitrator 2084 receives the output signals indicative of whether any conflicts have been detected, and resolves the conflict, for example, by sending a signal overriding the arbitration decisions of the conflicting arbitrators. As illustrated, the master arbitrator 2084 comprises least-recently-used (LRU) circuitry 2088 (e.g., an LRU cache). For example, the master arbitrator 2084, in operation, identifies the conflicting arbitrators based on the received signals indicative of arbitrator conflicts. A least recently selected arbitrator of the conflicting arbitrators is selected by the master arbitrator 2084. The decision of the selected arbitrator overrides the decisions of other conflicting arbitrators. In some embodiments, the arbitration schemes employed by arbitrators 1142 may take an override into consideration. For example, an update of a priority list associated with an arbitrator may be blocked when a decision of an arbitrator has been overridden by the master arbitrator.

Figure 21:
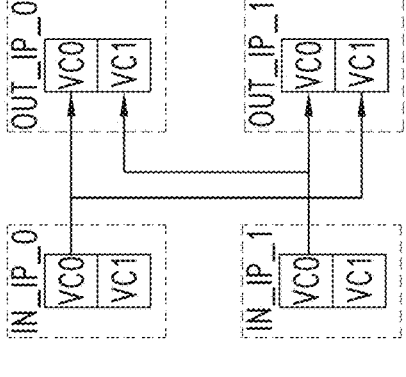
FIG. 21 is a conceptual diagram illustrating an example of detection and resolution of conflicts between arbitrators.
Figure 21:
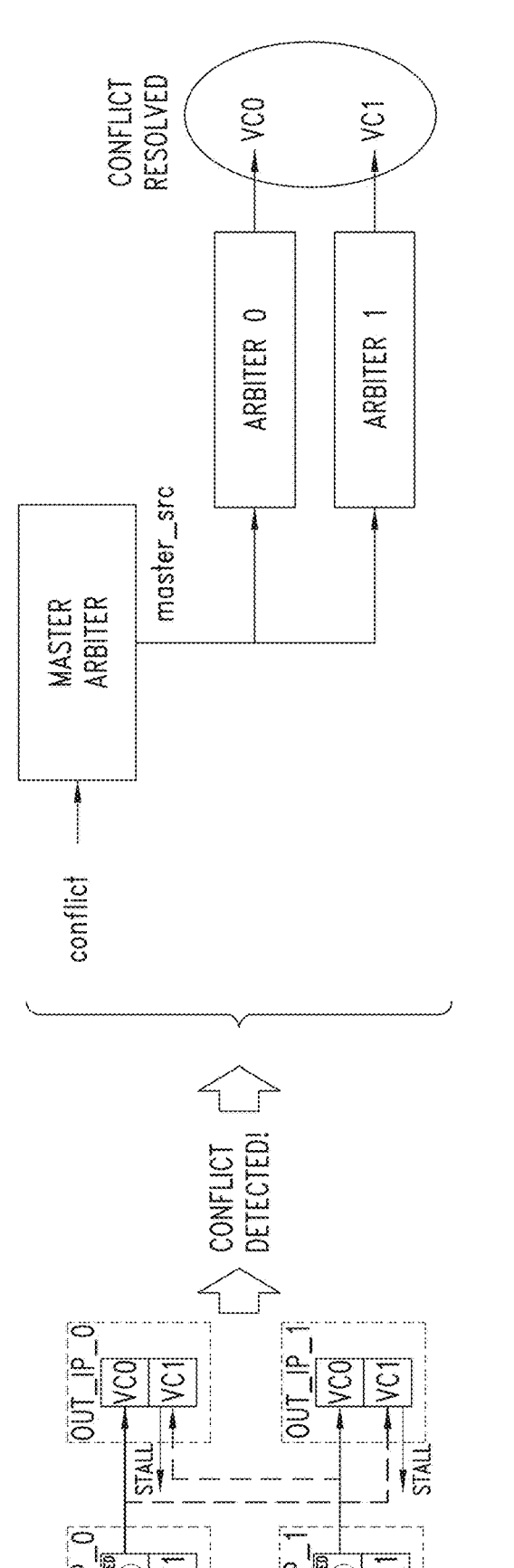
Figure 22:
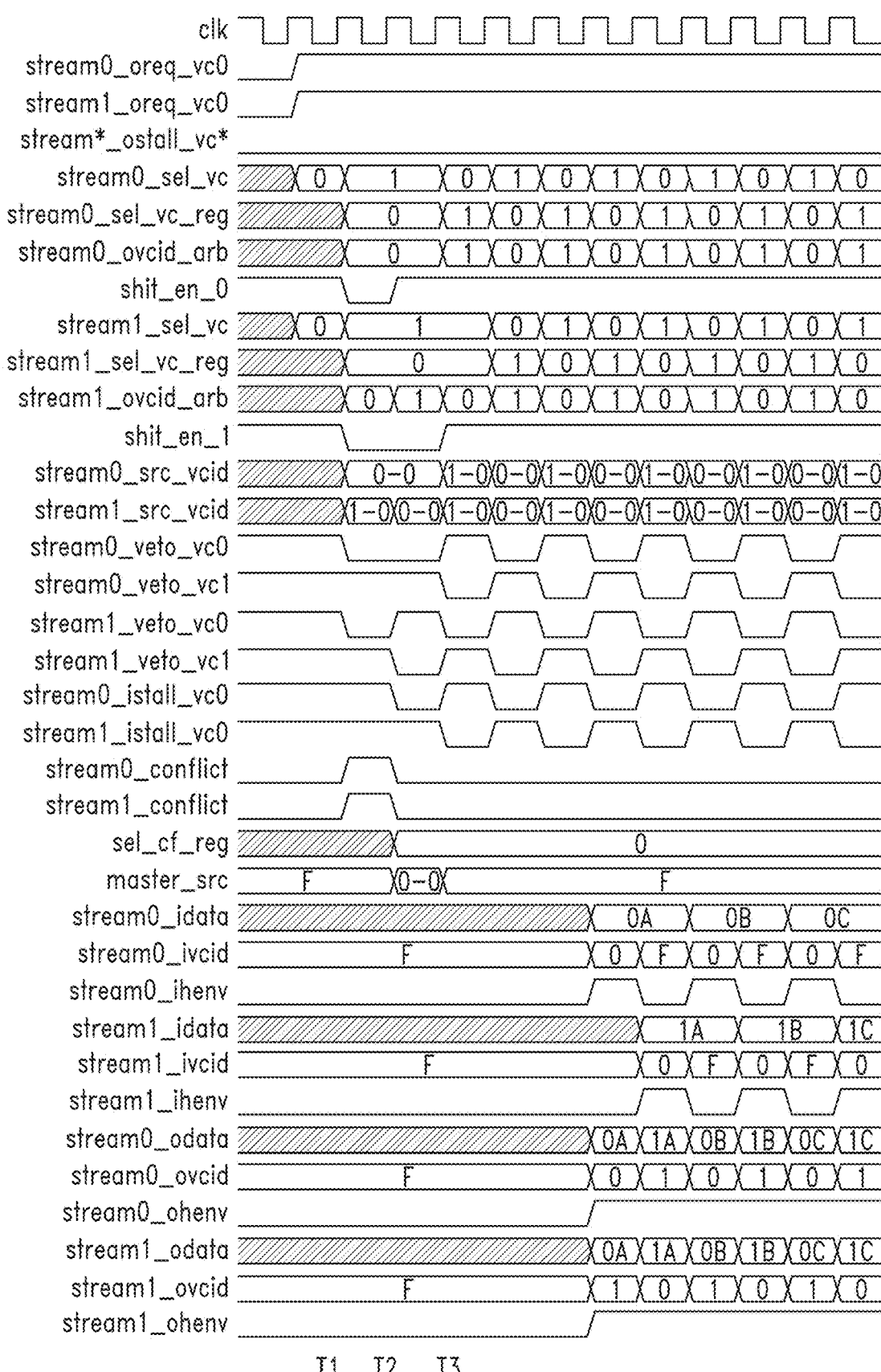
FIG. 22 is a timing diagram showing example signals generated in the example of FIG. 21.

FIG. 21 is a conceptual diagram illustration an example of detection and resolution of conflicts between arbitrators, and FIG. 22 is a timing diagram showing signals generated in the example of FIG. 21. FIGS. 21 and 22 and will be described for convenience with reference to FIGS. 19 and 20. As shown, the configuration information stored in the configuration registers 1138 maps virtual input channel 0 of input port 0 to virtual output channel 0 of output port 0 and to virtual output channel 1 of output port 1. The configuration information also maps virtual input channel 0 of input port 1 to virtual output channel 1 of output port 0 and to virtual output channel 0 of output port 1.

At time T1, the arbitrator 1142 associated with output port 0 selects virtual output channel 0 of output port 0, which means virtual channel 0 of input port 0 is selected for the starting time slot, and stall signals are asserted for the other virtual input channels, which are relevant with respect to data streaming to any virtual output port channels of output port 0 other than virtual channel 0, including virtual input channel 0 of input port 1, which is mapped to virtual output channel 1 of output port 0.

Also at time T1, the arbitrator 1142 associated with output port 1 selects virtual output channel 0 of output port 1, which means virtual channel 0 of input port 1 is selected for the starting time slot, and stall signals are asserted for the other virtual input channels, which are relevant with respect to data streaming to any virtual output port channels of output port 1 other than virtual channel 0, including virtual input channel 0 of input port 0, which is mapped to virtual output channel 1 of output port 1.

Conflicts arise because the choice of virtual output channel 0 by the arbitrator associated with output port 0 blocks transmission by virtual input channel 0 of input port 1, and choice of virtual output channel 0 by the arbitrator associated with output port 1 blocks transmission by virtual input channel 0 of input port 0. The conflicts are detected at time T2, and indications of the conflicts are provided to the master arbitrator, which resolves the conflict at time T3, as illustrated in FIG. 21 by signaling the arbitrator associated with output port 0 to select virtual output channel 0, and by signaling the arbitrator associated with output port 1 to select virtual output channel 1.

Figure 23:
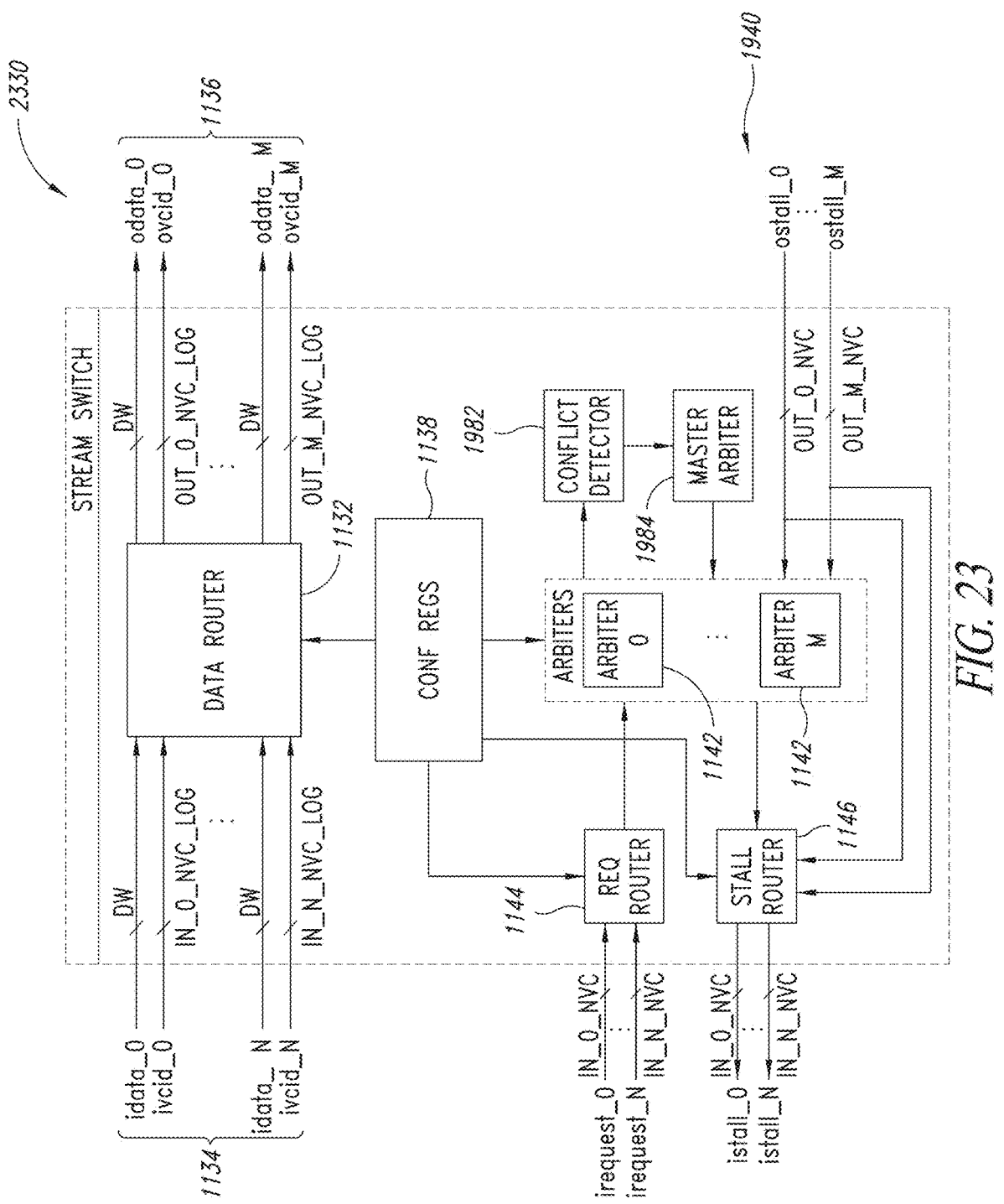
FIG. 23 is a functional block diagram of an embodiment of a stream switch employing a master arbiter and back-pressure signals.

Features of the various embodiments described herein may be combined in various manners. For example, FIG. 23 illustrates an embodiment of a stream switch 2330, which includes the backpressure features of the embodiment of the stream switch 1730 of FIG. 17, and the arbitration conflict resolution features of the embodiment of the stream switch 1930 of FIG. 19.

Figure 24:
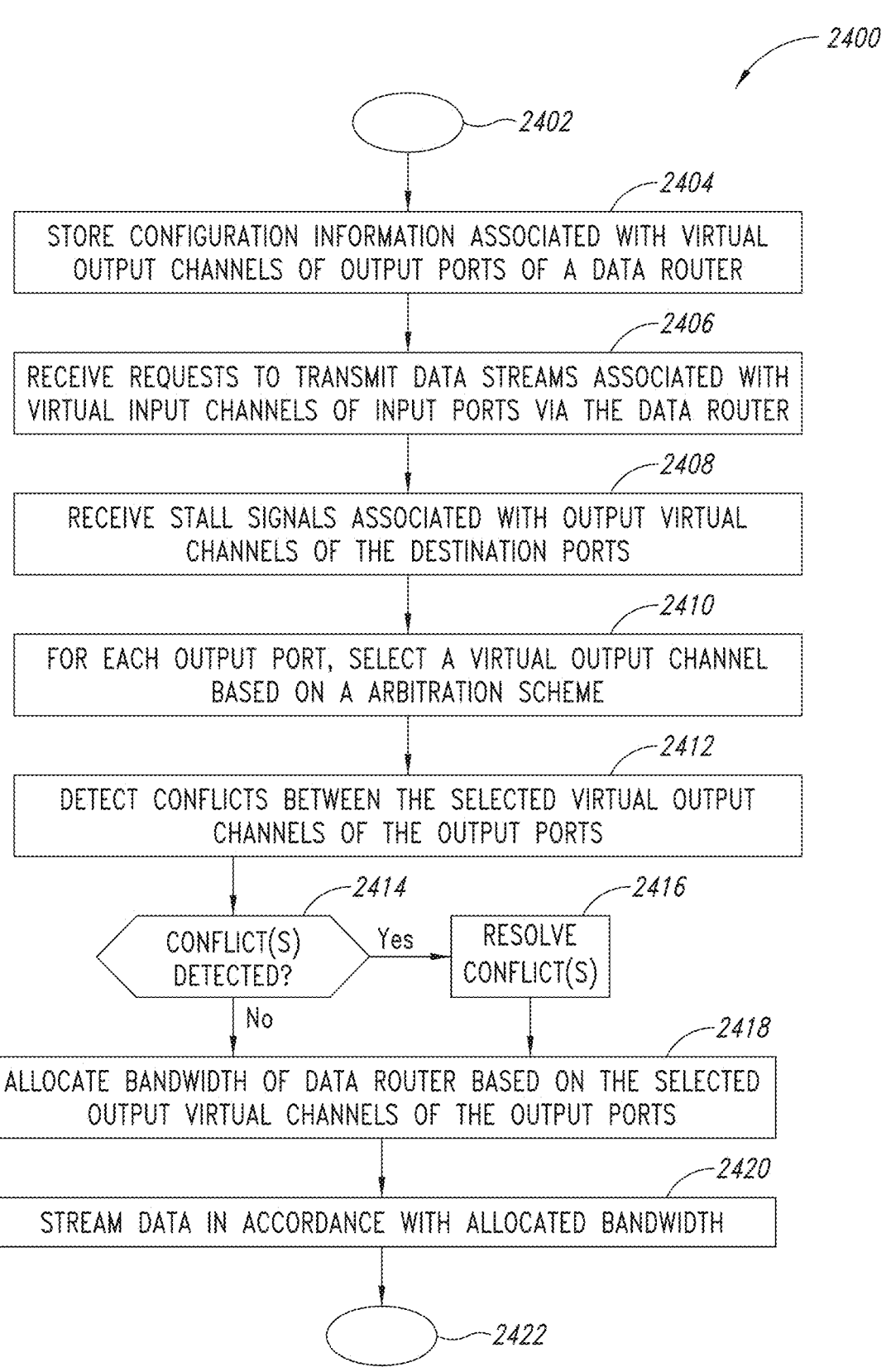
FIG. 24 is a flow diagram illustrating an embodiment of a process for allocating bandwidth of a data router to virtual data channels of a stream switch.

FIG. 24 illustrates an embodiment of a method 2400 of a process for allocating bandwidth of a data router to virtual data channels of a stream switch, such as a stream switch, that may be employed by various devices and systems, such as, for example, the hardware accelerator 120 of FIG. 9. For convenience, FIG. 24 will be described with reference to FIGS. 9-23.

The method 2400 starts at 2402 and proceed to 2404. At 2404, the method 2400 stores configuration data or information associated with virtual output channels of respective output ports of a plurality of output ports of a data router. The configuration data of a virtual output channel identifies a source input port and virtual input channel ID associated with the virtual output channel of the output port. This may be done, for example, as discussed above with reference to the data router 132 of FIG. 9 by storing the configuration information in configuration registers 138. The configuration data or information maps input virtual channels to output virtual channels, for example, as discussed above with reference to FIGS. 12 and 13 and the accompanying descriptions thereof. The method 2400 proceeds from 2404 to 2406.

At 2406, the method 2400 receives requests to transmit data streams associated with virtual input channels of input ports via the data router, as discussed above with reference to FIGS. 9-11 and 15, and the accompanying descriptions thereof. The method 2400 proceeds from 2406 to 2408.

At 2408, the method 2400 optionally receives stall signals associated with destinations of data to be streamed from output virtual ports of the data router, for example as discussed above with reference to FIGS. 17, 18 and 23, and the accompanying descriptions thereof. The received stall signals associated with output virtual channels of the destination ports facilitate implementing a backpressure mechanism to manage data flow associated with, for example, a hardware accelerating implementing a processing chain. The method 2400 proceeds from 2408 to 2410.

At 2410, the method 2400 selects, for each output port of a data router, a virtual output channel based on an arbitration scheme. The arbitration scheme considers the configuration information stored at 2404 and the requests received at 2406, and may consider the stall signals associated destinations of the output virtual channels in some embodiments. This may be done, for example, as discussed above with reference to FIG. 14, and the accompanying description thereof. The method 2400 proceeds from 2410 to 2412.

At 2412, the method 2400 optionally detects conflicts between the selected virtual output channels of the output ports. The method 2400 proceeds from 2412 to 2414, where the method 2400 determines whether one or more conflicts have been detected. When a conflict is detected at 2414, the method 2400 proceeds from 2414 to 2416, where the conflict is resolved, and proceeds from 2416 to 2418. The detecting and resolving of conflicts may be done, for example, as discussed above with reference to FIGS. 19-23, and the accompanying discussion thereof. The detecting and resolving of conflicts facilitates efficient scheduling of starting time slots by avoiding the allocation of starting time slots which cannot be used because of conflicts at an output port. When a conflict is not detected at 2414, the method proceeds from 2414 to 2418.

At 2418, the method 2400 allocates bandwidth of the data router based on the selected output virtual channels of the output ports and the received requests to transmit data streams. This may be done, for example, as discussed above with reference to FIGS. 9-23 and the accompanying description thereof. For example, stall signals may be generated based the configuration information and the selected output virtual channels, and the stall signals used to control the transmission of data streams by sources associated the the respective virtual input channels. The method 2400 proceeds from 2418 to 2420, where the data router streams data in accordance with the allocated bandwidth. For example, a data source may respond to a stall signal associated with the data source going low by starting transmission of a data stream after a threshold number of clock cycles have elapsed.

The method 2400 proceeds from 2420 to 2422, where the method 2400 may terminate, may return to 2404 to update the configuration information, may return to 2406 to process pending or newly received requests to transmit data streams, etc.

Embodiments of the foregoing processes and methods may contain additional acts not shown in FIG. 24, may not contain all of the acts shown in FIG. 24, may perform acts shown in FIG. 24 in various orders, may combine acts, may split acts into separate acts, and may be otherwise modified in various respects. For example, an embodiment of FIG. 24 may be modified to omit act 2408, to omit acts 2412-2416, to combine acts 2412-2416, to consider additional stored configuration information (e.g., whether a port is enabled), etc., and various combinations thereof. While the method 2400 of FIG. 24 is described as performing acts sequentially, it is to be understood that acts may be performed in parallel. For example, the receiving of requests to transmit data streams at 2406 may occur in parallel with the receiving of stall signals associated with destinations of the output virtual channels.

The use of a stream switch of an embodiment employing virtual channels facilitates providing better link utilization with lower area and power requirements as compared to a fully connected crossbar approach. As compared to a conventional NoC approach, in addition to reducing the area and power requirements, latency may be significantly reduced because the need to pack data packets, route the data packets through multiple hops via switches, and unpack the data packets is avoided.

In an embodiment, a stream switch comprises a data router, configuration registers and arbitration logic. The data router has a plurality of input ports, each input port having plurality of associated virtual input channels, and a plurality of output ports, each output port having a plurality of associated virtual output channels. The data router, in operation, transmits data streams from input ports of the plurality of input ports to one or more output ports of the plurality of output ports. The configuration registers are coupled to the data router and, in operation, store configuration data associated with the virtual output channels of the respective output ports of the plurality of output ports. The stored configuration data associated with a virtual output channel identifies a source input port and virtual input channel ID associated with the virtual output channel of the output port. The arbitration logic is coupled to the configuration registers and the data router. The arbitration logic, in operation, allocates bandwidth of the data router based on request signals associated with virtual input channels of the input ports and the configuration data associated with the virtual output channels.

In an embodiment, the arbitration logic, in operation, generates stall signals associated with respective virtual input channels, and a stall signal inhibits transmission of data by a source associated with the respective virtual input channel and the stall signal. In an embodiment, the stream switch comprises a stall router, which, in operation, routes stall signals to respective sources associated with virtual input channels of the input ports.

In an embodiment, the arbitration logic, in operation, employs a round-robin prioritization scheme to allocate the bandwidth.

In an embodiment, the arbitration logic comprises a plurality of arbitrators associated with respective output ports of the plurality of output ports. In an embodiment, the arbitration logic comprises a master arbitrator, which, in operation, arbitrates conflicts between arbitrators of the plurality of arbitrators associated with respective output ports. In an embodiment, the arbitration logic, in operation, implements a back-pressure mechanism based on an indication of whether a destination IP associated with an output port is ready to receive data.

In an embodiment, the arbitration logic, in operation, implements a back-pressure mechanism based on an indication of whether a destination IP associated with an output port is ready to receive data.

In an embodiment, the stream switch comprises a request router, which, in operation, routes request signals associated with virtual input channels to the arbitration logic based on the stored configuration data.

In an embodiment, the stream switch comprises destination routing circuitry, which, in operation, streams a data stream received at an input port to an output port of the data router based on a virtual input channel ID associated with the received data stream and the stored configuration data.

In an embodiment, the data router comprises: an additional input port having an associated virtual input channel; an additional output port having an associated virtual output channel; or an additional input port having an associated virtual input channel and an additional output port having an associated virtual output channel.

In an embodiment, a hardware accelerator comprises a plurality of processing elements, a plurality of streaming engines, and a stream switch. The stream switch is coupled to the plurality of processing elements and to the plurality of streaming engines. In operation, the stream switch streams data between the plurality of streaming engines and the plurality of processing elements. The stream switch includes a data router, configuration registers, and arbitration logic. The data router has a plurality of input ports, each input port having a plurality of associated virtual input channels, and a plurality of output ports, each output port having a plurality of associated virtual output channels. The data router, in operation, transmits data streams from input ports of the plurality of input ports to one or more output ports of the plurality of output ports. The configuration registers are coupled to the data router, and, in operation, store configuration data associated with the virtual output channels of the respective output ports of the plurality of output ports. The stored configuration data associated with a virtual output channel identifies a source input port and virtual input channel ID associated with the virtual output channel of the output port. The arbitration logic is coupled to the configuration registers and the data router. In operation, the arbitration logic allocates bandwidth of the data router based on request signals associated with virtual input channels of the input ports and the configuration data associated with the virtual output channels.

In an embodiment, the arbitration logic, in operation, generates stall signals associated with respective virtual input channels, and a stall signal inhibits transmission of data by a source associated with the respective virtual input channel and the stall signal.

In an embodiment, the arbitration logic comprises a plurality of arbitrators associated with respective output ports of the plurality of output ports. In an embodiment, the arbitration logic comprises a master arbitrator, which, in operation, arbitrates conflicts between arbitrators of the plurality of arbitrators associated with respective output ports.

In an embodiment, the arbitration logic, in operation, implements a back-pressure mechanism based on an indication of whether a destination IP associated with an output port is ready to receive data. In an embodiment, the destination associated with the output port is a processing element of the plurality of processing elements.

In an embodiment, the plurality of virtual input channels associated with an input port of the plurality of input ports includes: a virtual input channel associated with a processing element of the plurality of processing elements; and a virtual input channel associated with a streaming engine of the plurality of streaming engines.

In an embodiment, a method comprises storing configuration data associated with virtual output channels of output ports of a data router of a stream switch. The data router has a plurality of input ports, each having an associated plurality of virtual input channels, and a plurality of output ports, each having a plurality of associated virtual output channels. The stream switch receives requests to transmit data streams associated with respective virtual input channels of the plurality of input ports. For each output port of the plurality of output ports, a virtual output channel of the plurality of virtual output channels associated with the output port is selected, based on the request signals associated with virtual input channels of the input ports and the configuration data associated with the virtual output channels. Bandwidth of the data router is allocated to virtual input channels of the input ports based on the selected virtual output channels. Data is streamed via the data router based on the allocated bandwidth.

In an embodiment, the method comprises: receiving stall signals associated with destinations of the virtual output channels, wherein the allocating bandwidth is based on the received stall signals.

In an embodiment, the method comprises detecting conflicts between the selected virtual output channels, and in response to detecting a conflict between the selected virtual output channels, resolving the conflict.

In an embodiment, the streaming data via the data router comprises: streaming data from a processing element coupled to an input port of the plurality of input ports and associated with a first virtual input channel of the input port to a processing element coupled to an output port of the plurality of output ports and associated with the selected virtual output channel associated with the output port.

In an embodiment, a second virtual input channel of the input port is associated with a streaming engine coupled to the input port.

In an embodiment, a non-transitory computer-readable medium's contents cause a stream switch to perform a method. The method comprises storing configuration data associated with virtual output channels of output ports of a data router of the stream switch. The data router has a plurality of input ports, each having an associated plurality of virtual input channels, and a plurality of output ports, each having a plurality of associated virtual output channels. The stream switch receives requests to transmit data streams associated with respective virtual input channels of the plurality of input ports. For each output port of the plurality of output ports, a virtual output channel of the plurality of virtual output channels associated with the output port is selected, based on the request signals associated with virtual input channels of the input ports and the configuration data associated with the virtual output channels. Bandwidth of the data router is allocated to virtual input channels of the input ports based on the selected virtual output channels. Data is streamed via the data router based on the allocated bandwidth.

In an embodiment, the method includes receiving stall signals associated with destinations of the virtual output channels, wherein the allocating bandwidth is based on the received stall signals. In an embodiment, the contents comprise instructions executed by processing circuitry of the stream switch.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A stream switch, comprising:
a data router having:
a plurality of input ports, each input port having plurality of associated virtual input channels; and a plurality of output ports, each output port having a plurality of associated virtual output channels, wherein the data router, in operation, streams data tensors from input ports of the plurality of input ports to one or more output ports of the plurality of output ports;
configuration registers coupled to the data router, wherein the configuration registers, in operation, store configuration data associated with the virtual output channels of the respective output ports of the plurality of output ports, the stored configuration data associated with a virtual output channel identifying a source input port and virtual input channel ID associated with the virtual output channel of the output port; and
arbitration logic that performs output-level arbitration using a plurality of arbitrators corresponding to respective output ports of the plurality of output ports and comprises a master arbitrator that resolves conflicts between the plurality of arbitrators, wherein the arbitration logic is coupled to the configuration registers and the data router, wherein the arbitration logic, in operation, allocates bandwidth of the data router based on request signals associated with virtual input channels of the input ports and the configuration data associated with the virtual output channels.

2. The stream switch of claim 1, wherein the arbitration logic, in operation, generates stall signals associated with respective virtual input channels, and a stall signal inhibits transmission of data by a source associated with the respective virtual input channel and the stall signal.

3. The stream switch of claim 2, comprising a stall router, which, in operation, routes stall signals to respective sources associated with virtual input channels of the input ports.

4. The stream switch of claim 1, wherein the arbitration logic, in operation, employs a round-robin prioritization scheme to allocate the bandwidth.

5. The stream switch of claim 1, wherein the arbitration logic, in operation, implements a back-pressure mechanism based on an indication of whether a destination IP associated with an output port is ready to receive data.

6. The stream switch of claim 1, comprising a request router, which, in operation, routes request signals associated with virtual input channels to the arbitration logic based on the stored configuration data.

7. The stream switch of claim 1, comprising destination routing circuitry, which, in operation, streams a data tensor received at an input port to an output port of the data router based on a virtual input channel ID associated with the received data tensor and the stored configuration data.

8. The stream switch of claim 1, wherein the data router comprises:
an additional input port having an associated virtual input channel;
an additional output port having an associated virtual output channel; or
an additional input port having an associated virtual input channel and an additional output port having an associated virtual output channel.

9. The stream switch of claim 1, wherein a request signal associated with an input port of the plurality of input ports is a bitmap, with each bit of the bitmap indicating whether a source associated with a respective virtual input channel associated with the input port is requesting bandwidth to transmit a data tensor via the input port.

10. The stream switch of claim 3, wherein a stall signal associated with an input port of the plurality of input ports is a bitmap, with each bit of the bitmap indicating whether a source associated with a respective virtual input channel associated with the input port is allowed to transmit a data tensor via the input port.

11. A hardware accelerator, comprising:
a plurality of processing elements;
a plurality of streaming engines; and
a stream switch coupled to the plurality of processing elements and to the plurality of streaming engines, wherein the stream switch, in operation, streams data tensors between the plurality of streaming engines and the plurality of processing elements, the stream switch including:
a data router having:
a plurality of input ports, each input port having a plurality of associated virtual input channels; and
a plurality of output ports, each output port having a plurality of associated virtual output channels, wherein the data router, in operation, transmits data tensors from input ports of the plurality of input ports to one or more output ports of the plurality of output ports;
configuration registers coupled to the data router, wherein the configuration registers, in operation, store configuration data associated with the virtual output channels of the respective output ports of the plurality of output ports, the stored configuration data associated with a virtual output channel identifying a source input port and virtual input channel ID associated with the virtual output channel of the output port; and
arbitration logic that performs output-level arbitration using a plurality of arbitrators corresponding to respective output ports of the plurality of output ports and comprises a master arbitrator that resolves conflicts between the plurality of arbitrators, wherein the arbitration logic is coupled to the configuration registers and the data router, wherein the arbitration logic, in operation, allocates bandwidth of the data router based on request signals associated with virtual input channels of the input ports and the configuration data associated with the virtual output channels.

12. The hardware accelerator of claim 11, wherein the arbitration logic, in operation, generates stall signals associated with respective virtual input channels, and a stall signal inhibits transmission of data by a source associated with the respective virtual input channel and the stall signal.

13. The hardware accelerator of claim 11, wherein the arbitration logic, in operation, implements a back-pressure mechanism based on an indication of whether a destination IP associated with an output port is ready to receive data.

14. The hardware accelerator of claim 13, wherein the destination associated with the output port is a processing element of the plurality of processing elements.

15. The hardware accelerator of claim 11, wherein the plurality of virtual input channels associated with an input port of the plurality of input ports includes:
a virtual input channel associated with a processing element of the plurality of processing elements; and
a virtual input channel associated with a streaming engine of the plurality of streaming engines.

16. The hardware accelerator of claim 11, wherein a request signal associated with an input port of the plurality of input ports is a bitmap, with each bit of the bitmap indicating whether a source associated with a respective virtual input channel associated with the input port is requesting bandwidth to transmit a data tensor via the input port.

17. The hardware accelerator of claim 12, wherein a stall signal associated with an input port of the plurality of input ports is a bitmap, with each bit of the bitmap indicating whether a source associated with a respective virtual input channel associated with the input port is allowed to transmit a data tensor via the input port.

18. The hardware accelerator of claim 11, wherein the arbitration logic, in operation, employs a round-robin prioritization scheme to allocate the bandwidth.

19. The hardware accelerator of claim 11, comprising a request router, which, in operation, routes request signals associated with virtual input channels to the arbitration logic based on the stored configuration data.

20. The hardware accelerator of claim 11, comprising destination routing circuitry, which, in operation, streams a data tensor received at an input port to an output port of the data router based on a virtual input channel ID associated with the received data tensor and the stored configuration data.

21. The hardware accelerator of claim 11, wherein the data router comprises:
an additional input port having an associated virtual input channel;
an additional output port having an associated virtual output channel; or
an additional input port having an associated virtual input channel and an additional output port having an associated virtual output channel.

22. The hardware accelerator of claim 12, comprising a stall router, which, in operation, routes stall signals to respective sources associated with virtual input channels of the input ports.

23. A method, comprising:
storing configuration data associated with virtual output channels of output ports of a data router of a stream switch, the data router having a plurality of input ports, each having an associated plurality of virtual input channels, a plurality of output ports, each having a plurality of associated virtual output channels, and arbitration logic comprising a plurality of arbitrators corresponding to respective output ports of the plurality of output ports and a master arbitrator that resolves conflicts between the plurality of arbitrators;
receiving requests to transmit data tensors associated with respective virtual input channels of the plurality of input ports;
for each output port of the plurality of output ports, selecting, based on the request signals associated with virtual input channels of the input ports and the configuration data associated with the virtual output channels, a virtual output channel of the plurality of virtual output channels associated with the output port;
allocating, using the arbitration logic, bandwidth of the data router to virtual input channels of the input ports based on the selected virtual output channels; and
streaming data tensors via the data router based on the allocated bandwidth.

24. The method of claim 23, comprising:
receiving stall signals associated with destinations of the virtual output channels, wherein the allocating bandwidth is based on the received stall signals.

25. The method of claim 23, comprising:
detecting conflicts between the selected virtual output channels; and
in response to detecting a conflict between the selected virtual output channels, resolving the conflict.

26. The method of claim 23, wherein the streaming data tensors via the data router comprises:

streaming a data tensor from a processing element coupled to an input port of the plurality of input ports and associated with a first virtual input channel of the input port to a processing element coupled to an output port of the plurality of output ports and associated with the selected virtual output channel associated with the output port.

27. The method of claim 23, wherein a second virtual input channel of the input port is associated with a streaming engine coupled to the input port.

28. The method of claim 23, comprising generating a request signal associated with an input port of the plurality of input ports, wherein the request signal associated with the input port is a bitmap, with each bit of the bitmap indicating whether a source associated with a respective virtual input channel associated with the input port is requesting bandwidth to transmit a data tensor via the input port.

29. The method of claim 24, comprising generating a stall signal associated with an input port of the plurality of input ports, wherein the stall signal associated with the input port is a bitmap, with each bit of the bitmap indicating whether a source associated with a respective virtual input channel associated with the input port is allowed to transmit a data tensor via the input port.

30. A non-transitory computer-readable medium having contents which cause a stream switch to perform a method, the method comprising:

storing configuration data associated with virtual output channels of output ports of a data router of the stream switch, the data router having a plurality of input ports, each having an associated plurality of virtual input channels, a plurality of output ports, each having a plurality of associated virtual output channels, and arbitration logic comprising a plurality of arbitrators corresponding to respective output ports of the plurality of output ports and a master arbitrator that resolves conflicts between the plurality of arbitrators;

receiving requests to transmit data tensors associated with respective virtual input channels of the plurality of input ports;

for each output port of the plurality of output ports, selecting, based on the request signals associated with virtual input channels of the input ports and the configuration data associated with the virtual output channels, a virtual output channel of the plurality of virtual output channels associated with the output port;

allocating, using the arbitration logic, bandwidth of the data router to virtual input channels of the input ports based on the selected virtual output channels; and streaming data tensors via the data router based on the allocated bandwidth.

31. The non-transitory computer-readable medium of claim 30, wherein the method comprises:

receiving stall signals associated with destinations of the virtual output channels, wherein the allocating bandwidth is based on the received stall signals.

32. The non-transitory computer-readable medium of claim 30, wherein the contents comprise instructions executed by processing circuitry of the stream switch.

* * * * *